United States Patent
Khoshnevisan et al.

(10) Patent No.: US 11,324,024 B2
(45) Date of Patent: May 3, 2022

(54) UPLINK CHANNEL TRANSMISSION FOR MULTIPLE TRANSMIT RECEIVE POINTS (TRPS)

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US); Jing Sun, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 16/859,442

(22) Filed: Apr. 27, 2020

(65) Prior Publication Data

US 2020/0351916 A1    Nov. 5, 2020

Related U.S. Application Data

(60) Provisional application No. 62/842,315, filed on May 2, 2019.

(51) Int. Cl.
*H04W 72/04* (2009.01)
*H04W 72/12* (2009.01)
(Continued)

(52) U.S. Cl.
CPC ....... *H04W 72/1268* (2013.01); *H04W 72/02* (2013.01); *H04W 72/10* (2013.01); *H04W 72/1242* (2013.01)

(58) Field of Classification Search
CPC ..... H04B 7/024; H04L 5/0035; H04L 5/0044; H04L 5/0055; H04L 5/0064;
(Continued)

(56) References Cited

U.S. PATENT DOCUMENTS

| 2020/0014517 A1* | 1/2020 | Takeda | H04L 5/0007 |
| 2020/0163079 A1* | 5/2020 | Choi | H04L 5/0064 |

(Continued)

OTHER PUBLICATIONS

International Search Report and Written Opinion—PCT/US2020/030241—ISA/EPO—dated Oct. 16, 2020.
(Continued)

*Primary Examiner* — Phuc H Tran
(74) *Attorney, Agent, or Firm* — Harrity & Harrity, LLP/Qualcomm

(57) ABSTRACT

This disclosure provides systems, methods and apparatuses for uplink channel transmission for multiple transmit receive points (TRPs). In one aspect, a user equipment (UE) resolves overlapping physical uplink control channels (PUCCHs) in a slot or overlapping PUCCH(s) and PUSCH(s) that are mapped to a same TRP in a multi-TRP scenario and that are mapped to two or more different TRPs in the multi-TRP scenario. For example, in a multi-TRP scenario that includes two TRPs, the UE may eliminate overlap of these uplink channels for each of the two TRPs individually and may additionally eliminate overlap of these uplink channels between the two TRPs.

30 Claims, 11 Drawing Sheets

(51) Int. Cl.
*H04W 72/10* (2009.01)
*H04W 72/02* (2009.01)

(58) Field of Classification Search
CPC .... H04L 5/0098; H04W 72/02; H04W 72/10; H04W 72/1242; H04W 72/1247; H04W 72/1268
See application file for complete search history.

(56) References Cited

U.S. PATENT DOCUMENTS

| | | | |
|---|---|---|---|
| 2020/0196343 A1* | 6/2020 | Marinier | H04L 5/0092 |
| 2020/0205150 A1* | 6/2020 | Cheng | H04B 7/0691 |
| 2020/0274656 A1* | 8/2020 | Gordaychik | H04L 1/1854 |

OTHER PUBLICATIONS

Huawei, et al., "Enhancements on Multr-TRP/panel Transmission," 3GPP Draft, 3GPP TSG RAN WG1 Meeting #96, R1-1901567, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051599264, 14 pages, Retrieved from the Internet:URL: http://www.3gpp.org/ftp/tsg%5Fran/WG1%5FRL1/TSGR1%5F96/Docs/R1%2D1901567%2Ezip [retrieved on Feb. 16, 2019], paragraph [2.1.3].
Intel Corporation: "On Multi-TRP/multr-panel Transmission," 3GPP Draft, 3GPP TSG RAN WG1 Meeting #96bis, R1-1904313, MULTITRP, 3rd Generation Partnership Project (3GPP), Mobile Competence Centre, 650, Route Des Lucioles, F-06921, Sophia-Antipolis Cedex, France, vol. RAN WG1, No. Xi 'an, China, Apr. 8, 2019-Apr. 12, 2019, Apr. 7, 2019 (Apr. 7, 2019), XP051699615, pp. 1-17, Retrieved from the Internet: URL: http://www.3gpp.org/ftp/Meetings%5F3GPP%5FSYNC/RAN1/Docs/R1%2D1904313%2Ezip [retrieved on Apr. 7, 2019] section 3.
Panasonic: "On Multi-TRP Enhancements for NR MIMO in Rel. 16," 3GPP Draft, 3GPP TSG RAN WG1#96bis, R1-1904190_PANASONIC_NR_MIMO_MULTI_TRP_ENHANCEMENTS_VFINAL, 3rd Generation Partnership Project (3GPP), Mobile Competence Centre, 650, Route Des Lucioles, F-06921, Sophia-Antipolis Cedex, France, vol. RAN WG1, No. Xi 'an, China, Apr. 8, 2019-Apr. 12, 2019, Apr. 7, 2019 (Apr. 7, 2019), XP051699522, 13 pages.

VIVO: "Further Discussion on Multi-TRP Transmission," 3GPP Draft, 3GPP TSG RAN WG1 #bis, R1-1905817, Further Discussion on Multi-TRP Transmission, 3rd Generation Partnership Project (3GPP), Mobile Competence Centre, 650, Route Des Lucioles, F-06921, Sophia-Antipolis Cedex, France, vol. RAN WG1. No. Xi 'an. China; Apr. 8, 2019-Apr. 12, 2019, Apr. 15, 2019 (Apr. 15, 2019), XP051707864, 14 pages.
Huawei, et al., "Enhancements on Multi-TRP/panel Transmission," 3GPP Draft, 3GPP TSG RAN WG1 Meeting #96, R1-1901567, 3RD Generation Partnership Project (3GPP), Mobile Competence Centre, 650, Route Des Lucioles, F-06921, Sophia-Antipolis Cedex, France, vol. RAN WG1, No. Athens, Greece; 20190225-20190301, Feb. 16, 2019 (Feb. 16, 2019), XP051599264, 14 pages, Retrieved from the Internet:URL: http://www.3gpp.org/ftp/tsg%5Fran/WG1%5FRL1/TSGR1%5F96/Docs/R1%2D1901567%2Ezip [retrieved on Feb. 16, 2019], paragraph [2.1.3].
Intel Corporation: "On Multi-TRP/multi-panel Transmission," 3GPP Draft, 3GPP TSG RAN WG1 Meeting #96bis, R1-1904313, Multitrp, 3RD Generation Partnership Project (3GPP), Mobile Competence Centre, 650, Route Des Lucioles, F-06921, Sophia-Antipolis Cedex, France, vol. Ran WG1, No. Xi 'an, China, Apr. 8, 2019-Apr. 12, 2019, Apr. 7, 2019 (Apr. 7, 2019), XP051699615, pp. 1-17, Retrieved from the Internet: URL: http://www.3gpp.org/ftp/Meetings%5F3GPP%5FSYNC/RAN1/Docs/R1%2D1904313%2Ezip [retrieved on Apr. 7, 2019] section 3.
PANASONIC: "On Multi-TRP Enhancements for Nr Mimo in ReL 16," 3GPP Draft, 3GPP Tsg Ran WG1 #96bis, R1-1904190_PANASONIC_NR_MIMO_MULTI_TRP_ENHANCEMENTS_VFINAL, 3RD Generation Partnership Project (3GPP), Mobile Competence Centre, 650, Route Des Lucioles, F-06921, Sophia-Antipolis Cedex, France, vol. Ran WG1, No. Xi 'an, China, 20190408 -20190412, Apr. 7, 2019 (2019-04-07), XP051699522, 13 pages, Retrieved from the Internet: URL: http://www.3gpp.org/ftp/Meetings%5F3GPP%5FSYNC/RAN1/Docs/R1%2D1904190%2Ezip [retrieved on 2019-04-07], section 2.4.
Partial International Search Report—PCT/US2020/030241—ISA/EPO—dated Aug. 25, 2020.
VIVO: "Further Discussion on Multi-TRP Transmission, "3GPP Draft, 3GPP Tsg Ran WG1 #96bis, R1-1905817, Further Discussion on Multi-TRP Transmission, 3RD Generation Partnership Project (3GPP), Mobile Competence Centre, 650, Route Des Lucioles, F-06921, Sophia-Antipolis Cedex, France, vol. Ran WG1. No. Xi 'an. China; 20190408-20190412, Apr. 15, 2019 (Apr. 15, 2019), XP051707864, 14 pages, Retrieved from the Internet:URL: http://www.3gpp.org/ftp/tsg%5Fran/WG1%5FRL1/TSGR1%5F96b/Docs/R1%2D1905817%2Ezi p [retrieved on Apr. 15, 2019], section 5.

* cited by examiner

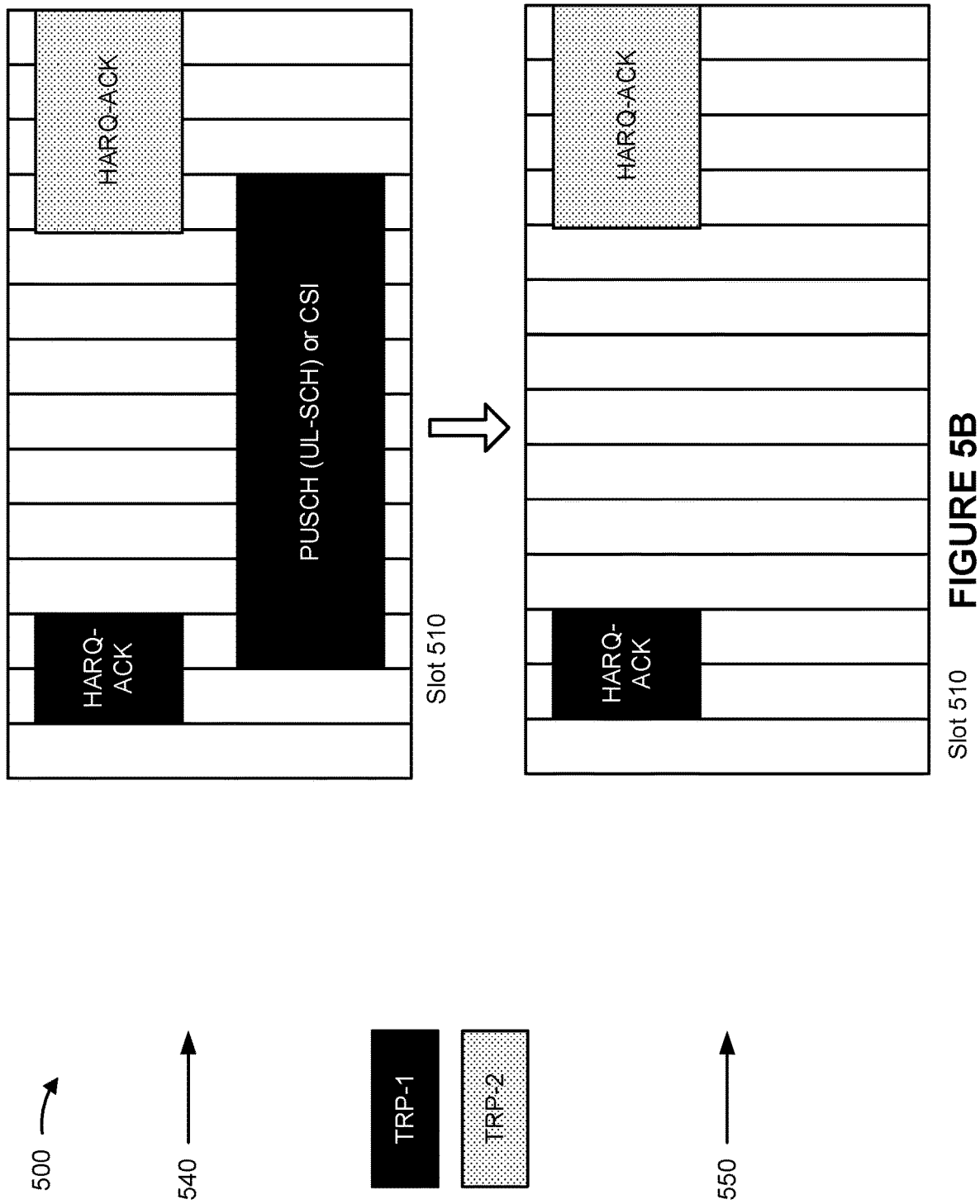

UPLINK CHANNEL TRANSMISSION FOR MULTIPLE TRANSMIT RECEIVE POINTS (TRPS)

CROSS-REFERENCE TO RELATED APPLICATION

This Patent Application claims priority to U.S. Provisional Patent Application No. 62/842,315, filed on May 2, 2019, entitled "UPLINK CHANNEL TRANSMISSION FOR MULTIPLE TRANSMIT RECEIVE POINTS (TRPs)," and assigned to the assignee hereof. The disclosure of the prior Application is considered part of and is incorporated by reference in this Patent Application.

TECHNICAL FIELD

Aspects of the present disclosure relate generally to wireless communication, and to techniques and apparatuses for uplink channel transmission for multiple transmit receive points (TRPs).

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, a 5G NodeB, or further examples thereof.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include determining association information that indicates mappings between multiple transmit receive points (TRPs) and uplink channels, where the uplink channels are associated with corresponding uplink transmissions to the multiple TRPs; multiplexing or dropping one or more first overlapping uplink channels of the uplink channels, where the one or more first overlapping uplink channels are mapped to a same TRP of the multiple TRPs; dropping one or more second overlapping uplink channels, of the uplink channels, that overlap across different TRPs of the multiple TRPs; and transmitting, to the multiple TRPs, non-overlapping uplink transmissions associated with one or more non-overlapping uplink channels, remaining from the corresponding uplink channels after the multiplexing or dropping of the one or more first overlapping uplink channels and after the dropping of the one or more second overlapping uplink channels.

In some aspects, the multiplexing or dropping of the one or more first overlapping uplink channels is performed prior to the dropping of the one or more second overlapping uplink channels. In some aspects, the dropping of the one or more second overlapping uplink channels is based at least in part on a set of priority rules related to the uplink channels. In some aspects, the set of priority rules is based at least in part on corresponding priorities for the multiple TRPs.

In some aspects, the set of priority rules is based at least in part on corresponding priorities associated with the uplink channels. In some aspects, the set of priority rules is based at least in part on corresponding priorities for payload types of the uplink channels. In some aspects, the set of priority rules is based at least in part on corresponding priorities for traffic types of the uplink channels.

In some aspects, the set of priority rules is based at least in part on a combination of two or more of: corresponding priorities for the multiple TRPs, corresponding priorities associated with the uplink channels, corresponding priorities for payload types of the uplink channels, or corresponding priorities for traffic types of the uplink channels. In some aspects, the set of priority rules is based at least in part on a hierarchy between two or more of: corresponding priorities for the multiple TRPs, corresponding priorities associated with the uplink channels, corresponding priorities for payload types of the uplink channels, or corresponding priorities for traffic types of the uplink channels.

In some aspects, the dropping of the one or more second overlapping uplink channels is performed iteratively by: comparing two different uplink channels associated with respective TRPs of the multiple TRPs, and dropping one of the two different uplink channels. In some aspects, the comparing starts from an earliest uplink channel of the two different uplink channels. In some aspects, the dropping of the one or more second overlapping uplink channels is based at least in part on penalty values corresponding to the uplink channels.

In some aspects, a penalty value for an uplink channel of the uplink channels is based at least in part on a quantity of other uplink channels that overlap with the uplink channel. In some aspects, a penalty value for an uplink channel of the uplink channels is based at least in part on corresponding priorities for one or more other uplink channels, of the uplink channels, that overlap with the uplink channel.

In some aspects, the dropping of the one or more second overlapping uplink channels is performed prior to the multiplexing or dropping of the overlapping uplink channels. In some aspects, a set of uplink channels associated with a same TRP, of the multiple TRPs, is not dropped. In some aspects, the association information is based at least in part on respective control resource set pool indexes associated with the multiple TRPs.

Another innovative aspect of the subject matter described in this disclosure can be implemented in a UE for wireless communication, such as in an apparatus of the UE. The apparatus of the UE may determine association information that indicates mappings between multiple TRPs and uplink channels, where the uplink channels are associated with corresponding uplink transmissions to the multiple TRPs; multiplex or drop one or more first overlapping uplink channels of the uplink channels, where the one or more first overlapping uplink channels are mapped to a same TRP of the multiple TRPs; drop one or more second overlapping uplink channels, of the uplink channels, that overlap across different TRPs of the multiple TRPs; and transmit, to the multiple TRPs, non-overlapping uplink transmissions associated with one or more non-overlapping uplink channels, remaining from the corresponding uplink channels after the multiplexing or dropping of the one or more first overlapping uplink channels and after the dropping of the one or more second overlapping uplink channels. In some aspects, the UE or the apparatus of the UE may perform or implement any one or more of the aspects described in connection with the method, above or elsewhere herein.

Another innovative aspect of the subject matter described in this disclosure can be implemented in an apparatus of a UE for wireless communication. The apparatus may include a processing system configured to determine association information that indicates mappings between multiple TRPs and uplink channels, where the uplink channels are associated with corresponding uplink transmissions to the multiple TRPs; multiplex or drop one or more first overlapping uplink channels of the uplink channels, where the one or more first overlapping uplink channels are mapped to a same TRP of the multiple TRPs; and drop one or more second overlapping uplink channels, of the uplink channels, that overlap across different TRPs of the multiple TRPs. The apparatus of the UE may include an interface configured to output non-overlapping uplink transmissions associated with one or more non-overlapping uplink channels, remaining from the corresponding uplink channels after the multiplexing or dropping of the one or more first overlapping uplink channels and after the dropping of the one or more second overlapping uplink channels. In some aspects, the apparatus of the UE may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to determine association information that indicates mappings between multiple TRPs and uplink channels, where the uplink channels are associated with corresponding uplink transmissions to the multiple TRPs; multiplex or drop one or more first overlapping uplink channels of the uplink channels, where the one or more first overlapping uplink channels are mapped to a same TRP of the multiple TRPs; drop one or more second overlapping uplink channels, of the uplink channels, that overlap across different TRPs of the multiple TRPs; and transmit, to the multiple TRPs, non-overlapping uplink transmissions associated with one or more non-overlapping uplink channels, remaining from the corresponding uplink channels after the multiplexing or dropping of the one or more first overlapping uplink channels and after the dropping of the one or more second overlapping uplink channels. In some aspects, the non-transitory computer-readable medium may implement any one or more of the aspects described in connection with the method, above or elsewhere herein.

Another innovative aspect of the subject matter described in this disclosure can be implemented in an apparatus for wireless communication. The apparatus may include means for determining association information that indicates mappings between multiple TRPs and uplink channels, where the uplink channels are associated with corresponding uplink transmissions to the multiple TRPs; means for multiplexing or dropping one or more first overlapping uplink channels of the uplink channels, where the one or more first overlapping uplink channels are mapped to a same TRP of the multiple TRPs; means for dropping one or more second overlapping uplink channels, of the uplink channels, that overlap across different TRPs of the multiple TRPs; and means for transmitting, to the multiple TRPs, non-overlapping uplink transmissions associated with one or more non-overlapping uplink channels, remaining from the corresponding uplink channels after the multiplexing or dropping of the one or more first overlapping uplink channels and after the dropping of the one or more second overlapping uplink channels. In some aspects, the apparatus may perform or implement any one or more of the aspects described in connection with the method, above or elsewhere herein.

One innovative aspect of the subject matter described in this disclosure can be implemented in a method of wireless communication performed by an apparatus of a UE. The method may include determining to use resources from a first group of PUCCH resources, or from one or more second groups of PUCCH resources, for multiple uplink channels to multiple TRPs based at least in part on whether the multiple uplink channels are overlapping with each other, where the first group of PUCCH resources includes multiple subgroups of PUCCH resources corresponding to the multiple TRPs, where the one or more second groups of PUCCH resources do not overlap with each other; and transmitting, based at least in part on determining to use the resources from the first group of PUCCH resources or from the one or more second groups of PUCCH resources, multiple uplink transmissions, associated with non-overlapping uplink channels of the multiple uplink channels, to the multiple TRPs.

In some aspects, the one or more second groups of PUCCH resources include groups of PUCCH resources corresponding to the multiple TRPs. In some aspects, the method can include selecting the resources from the group of PUCCH resources for the multiple uplink channels prior to determining to use the resources from the group of PUCCH resources or from the one or more second groups of PUCCH resources.

In some aspects, the method can include determining to use the resources from the group of PUCCH resources and not from the one or more second groups of PUCCH resources based at least in part on the multiple uplink channels not overlapping on the resources from the group of PUCCH resources. In some aspects, the method can include determining to use the resources from the one or more second groups of PUCCH resources based at least in part on the multiple uplink channels overlapping on the resources from the group of PUCCH resources.

In some aspects, the method can include determining to use the resources from the group of PUCCH resources for one or more of the multiple uplink channels and to use the resources from the one or more second groups of PUCCH resources for one or more second uplink channels of the multiple uplink channels, or determining to not use the resources from the group of PUCCH resources and to only use the resources from the one or more second groups of PUCCH resources for the multiple uplink channels. In some aspects, the resources from the one or more second groups of PUCCH resources are selected using at least one of: a PUCCH resource indicator (PRI), or a fixed radio resource control (RRC) configuration. In some aspects, the method can include performing dropping of one or more of the multiple uplink channels in association with determining to use the resources from the group of PUCCH resources or from the one or more second groups of PUCCH resources.

Another innovative aspect of the subject matter described in this disclosure can be implemented in an apparatus of a UE for wireless communication. The apparatus may be configured to determine to use resources from a first group of PUCCH resources, or from one or more second groups of PUCCH resources, for multiple uplink channels to multiple TRPs based at least in part on whether the multiple uplink channels are overlapping with each other, where the first group of PUCCH resources includes multiple subgroups of PUCCH resources corresponding to the multiple TRPs, where the one or more second groups of PUCCH resources do not overlap with each other; and transmit, based at least in part on determining to use the resources from the first group of PUCCH resources or from the one or more second groups of PUCCH resources, multiple uplink transmissions, associated with non-overlapping uplink channels of the multiple uplink channels, to the multiple TRPs. In some aspects, the UE may perform or implement any one or more of the aspects described in connection with the method, above or elsewhere herein.

Another innovative aspect of the subject matter described in this disclosure can be implemented in an apparatus of a UE for wireless communication. The apparatus may include a processing configured to configured to determine to use resources from a first group of PUCCH resources, or from one or more second groups of PUCCH resources, for multiple uplink channels to multiple TRPs based at least in part on whether the multiple uplink channels are overlapping with each other, where the first group of PUCCH resources includes multiple subgroups of PUCCH resources corresponding to the multiple TRPs, where the one or more second groups of PUCCH resources do not overlap with each other. The apparatus may include an interface configured to output, based at least in part on determining to use the resources from the first group of PUCCH resources or from the one or more second groups of PUCCH resources, multiple uplink transmissions, associated with non-overlapping uplink channels of the multiple uplink channels, to the multiple TRPs. In some aspects, the apparatus of the UE may perform or implement any one or more of the aspects described in connection with the method, above or elsewhere herein.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to determine to use resources from a first group of PUCCH resources, or from one or more second groups of PUCCH resources, for multiple uplink channels to multiple TRPs based at least in part on whether the multiple uplink channels are overlapping with each other, where the first group of PUCCH resources includes multiple subgroups of PUCCH resources corresponding to the multiple TRPs, where the one or more second groups of PUCCH resources do not overlap with each other; and transmit, based at least in part on determining to use the resources from the first group of PUCCH resources or from the one or more second groups of PUCCH resources, multiple uplink transmissions, associated with non-overlapping uplink channels of the multiple uplink channels, to the multiple TRPs. In some aspects, the non-transitory computer-readable medium may implement any one or more of the aspects described in connection with the method, above or elsewhere herein.

Another innovative aspect of the subject matter described in this disclosure can be implemented in an apparatus for wireless communication. The apparatus may include means for determining to use resources from a first group of PUCCH resources, or from one or more second groups of PUCCH resources, for multiple uplink channels to multiple TRPs based at least in part on whether the multiple uplink channels are overlapping with each other, where the first group of PUCCH resources includes multiple subgroups of PUCCH resources corresponding to the multiple TRPs, where the one or more second groups of PUCCH resources do not overlap with each other; and means for transmitting, based at least in part on determining to use the resources from the first group of PUCCH resources or from the one or more second groups of PUCCH resources, multiple uplink transmissions, associated with non-overlapping uplink channels of the multiple uplink channels, to the multiple TRPs. In some aspects, the apparatus may perform or implement any one or more of the aspects described in connection with the method, above or elsewhere herein.

Aspects generally include a method, apparatus, system, computer program product, non-transitory computer-readable medium, user equipment, base station, wireless communication device, and processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
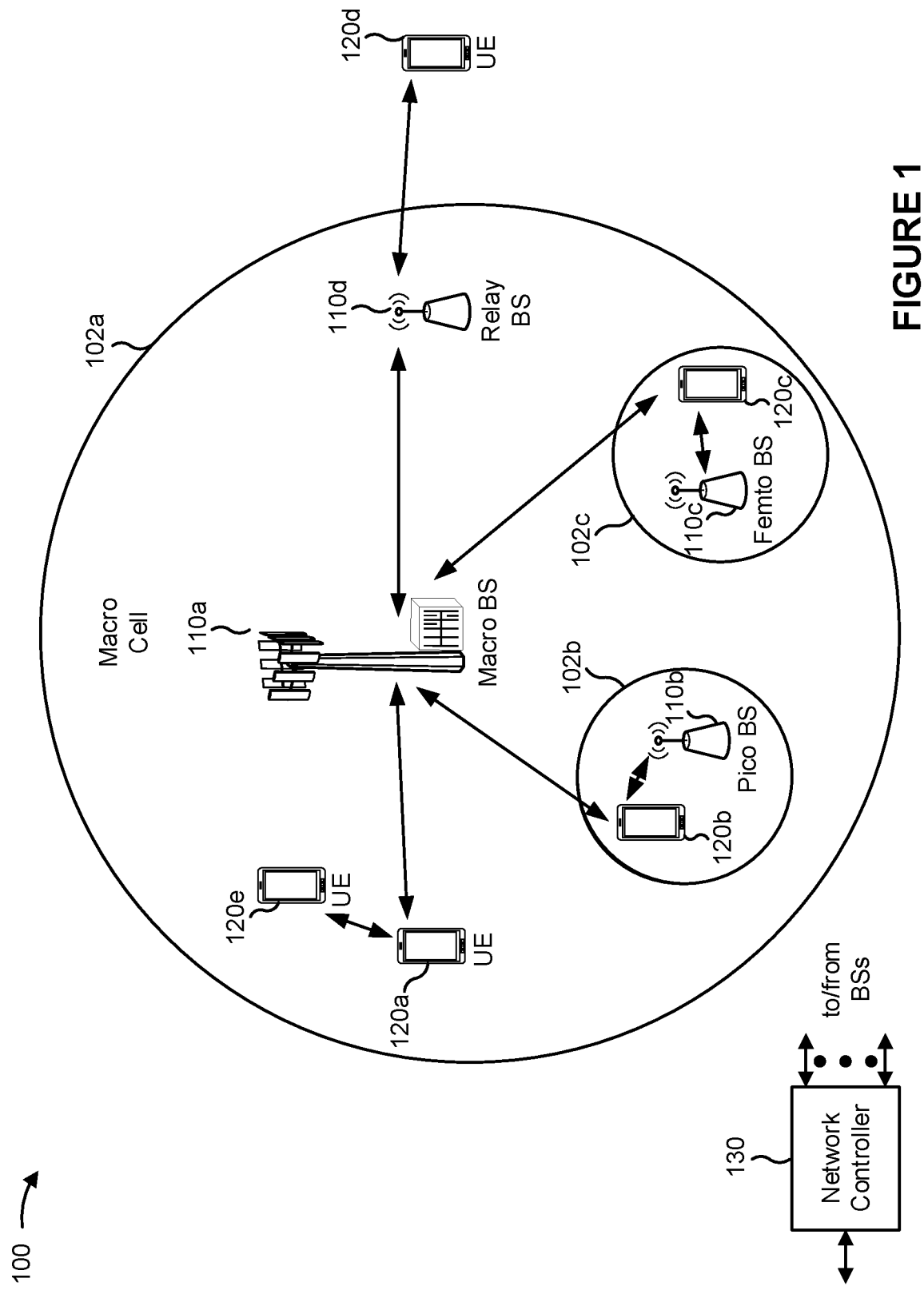
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

For some multi-transmit receive point (TRP) transmission configurations, two physical downlink control channel (PDCCH) transmissions may be used for scheduling. For example, first downlink control information (DCI) transmitted from a first TRP schedules a first physical downlink shared channel (PDSCH) transmission from the first TRP, and a second DCI transmitted from a second TRP schedules a second PDSCH transmission from the second TRP. A UE may identify an association of a channel (such as a physical PDCCH, PDSCH, a physical uplink control channel (PUCCH), or a physical uplink shared channel (PUSCH)) based on a value, referred to as a CORESET pool index (such as the parameter CORESETPoolIndex). In some aspects, the value can take values of 0 or 1 corresponding to first and second TRPs, respectively. In some examples, the value of the CORESET pool index is configured for each CORESET, and if a DCI is detected in a CORESET configured with a value of the CORESET pool index, the received DCI and a channel scheduled by that DCI (such as a PDSCH, a PUCCH for hybrid automatic repeat request (HARD) acknowledgment (HARQ-Ack), or a PUSCH) are also associated with the same value of CORESET pool index. This may be referred to as a multi-DCI multi-TRP deployment or configuration, as compared to a single-DCI multi-TRP deployment or configuration in which a single DCI, transmitted by one of the two TRPs, schedules transmissions by both of the TRPs. In the case of a non-ideal backhaul between TRPs, hybrid automatic repeat request (HARQ)-ACK payloads are determined separately for each TRP. In this case, a user equipment (UE) transmits separate physical uplink control channel (PUCCH) transmissions carrying separate HARQ-ACK payloads for each TRP. The UE may need to multiplex or drop uplink transmissions that overlap, such as overlapping uplink control information (UCI) (such as HARQ-ACKs, scheduling requests (SR) or channel state information (CSI)), or physical uplink shared channels (PUSCHs). In some aspects, due to a lack of information sharing among the TRPs related to scheduling decisions, UCI and PUSCH multiplexing produces a non-ideal backhaul scenario.

In addition, there might be different priorities or service levels associated with communications for each TRP in a multi-TRP scenario. For example, the communication may be related to an Enhanced Mobile Broadband (eMBB) service (which may have a relatively low priority) and an ultra reliable low latency communications (URLLC) service (which may have a higher priority than the eMBB service). In this case, the HARQ-ACK payloads for the eMBB service and for the URLLC service can be different. In a multi-TRP scenario, an UCI or a PUSCH to each TRP may be associated with the eMBB service or the URLLC service. For example, there may be a HARQ-ACK for a URLLC service associated with a first TRP, a HARQ-ACK for an eMBB service associated with the first TRP, a HARQ-ACK for a URLLC service associated with a second TRP, and a HARQ-ACK for an eMBB service associated with the second TRP. As a result, there may be overlap of a PUCCH or PUSCH for the first and second TRPs or for the eMBB service and the URLLC service, leading to ambiguity in how such an overlap should be resolved using multiplexing or dropping rules.

Some techniques and apparatuses described herein provide a UE that is capable of resolving overlap of uplink channels, such as overlapping PUCCHs in a slot or overlapping PUCCH(s) and PUSCH(s) in a slot, for each TRP in a multi-TRP scenario and across TRPs in the multi-TRP scenario. For example, in a non-ideal backhaul multi-TRP scenario that includes two TRPs, the UE may eliminate overlap of the uplink channels for each of the two TRPs individually (such as when a single TRP is to receive two uplink channels, transmitted by a UE, that overlap each other in time) and may additionally eliminate overlap of the uplink channels between the two TRPs (such as when the UE is to transmit two uplink channels that overlap each other in time to different TRPs).

Particular implementations of the subject matter described in this disclosure can be implemented to realize one or more of the following potential advantages. For example, some techniques and apparatuses described herein may improve operations of the UE by providing a way to resolve overlapping channels in a multi-TRP scenario when the TRPs would otherwise be incapable of resolving such overlap through scheduling (including scenarios where the uplink channels from the UE have different priorities or service levels). In addition, resolving overlap in the manner described herein may result in non-overlapping channels for each TRP and across the TRPs, thereby improving communications between the UE and multiple TRPs. Still further, resolving overlap in the manner described herein may improve spectral efficiency of communications and may reduce reliance on retransmission of such communications, thereby improving utilization of computing and communication resources. In addition, such rules for resolving overlap between different uplink channels may enable each TRP to schedule/configure uplink channels over substantially all available resources. Additionally, when different uplink channels overlap, the UE may be capable of resolving the overlapping issues. For example, in the absence of such rules, TRPs may need to semi-statically divide the uplink resources such that different uplink channels do not overlap, which may result in lower spectral efficiency.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, a transmit receive point (TRP), or further examples thereof. Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some aspects, a base station may include one or more TRPs. TRPs may be used to perform concurrent communications with a UE. For example, a UE may communicate with a first TRP and a second TRP. In some aspects, the first TRP and the second TRP may be base stations (such as the BS 110), respectively. In some aspects, the first TRP and the second TRP may be remote radio heads (RRHs), respectively. In some aspects, the first TRP and the second TRP may be respective antenna panels of a base station or an RRH. In some aspects, the first TRP and the second TRP may be associated with respective sets of antennas of an antenna panel. For example, the first TRP may be associated with a first set of antennas and the second TRP may be associated with a second set of antennas, thereby differentiating the first TRP from the second TRP in the spatial domain. In some aspects, the first TRP and the second TRP may be a combination of two or more different types of TRPs described in this paragraph.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things)

devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
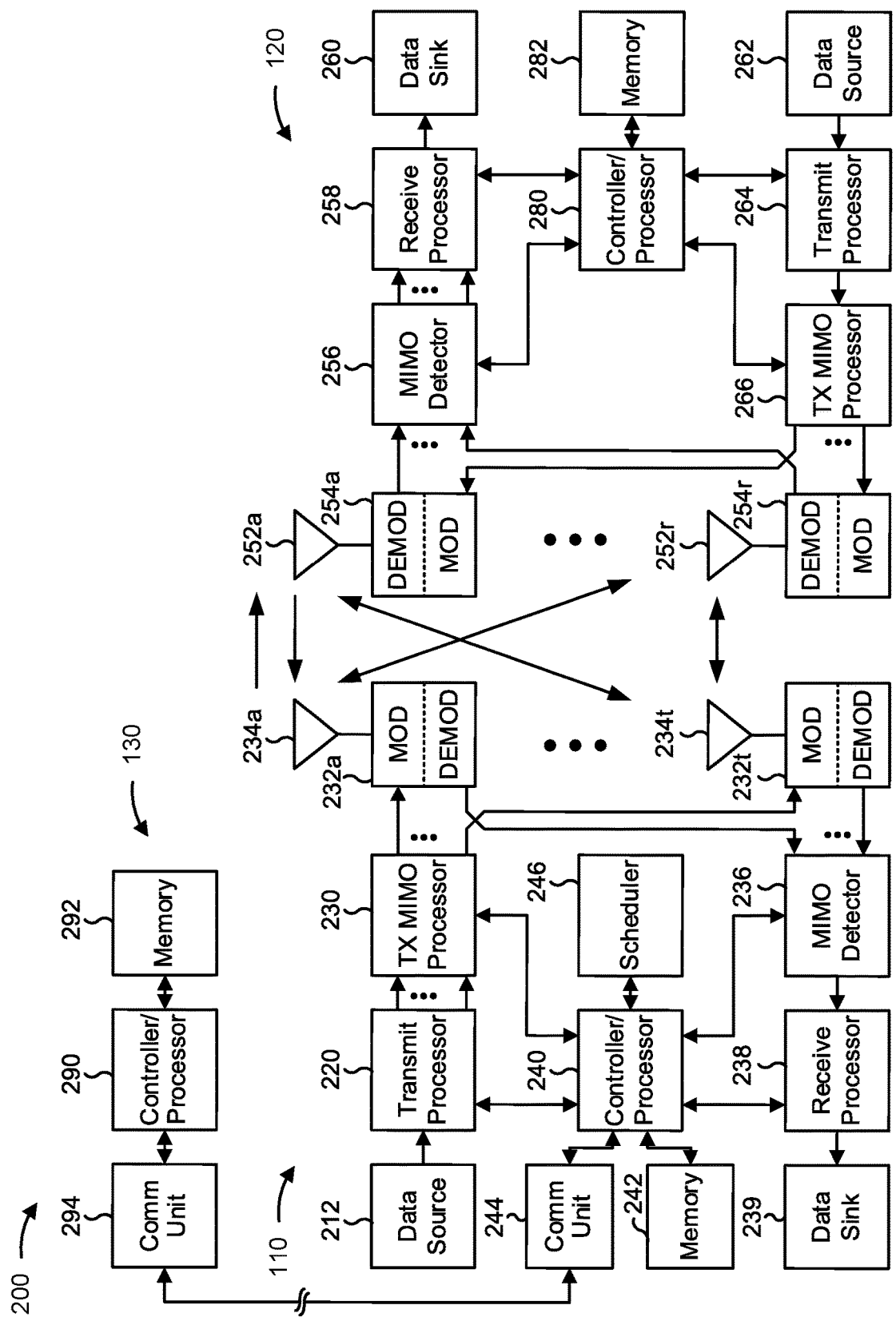
FIG. 2 is a block diagram conceptually illustrating an example of a base station (BS) in communication with a user equipment (UE) in a wireless network.

FIG. 2 is a block diagram conceptually illustrating an example 200 of a base station 110 in communication with a UE 120. In some aspects, base station 110 and UE 120 may respectively be one of the base stations and one of the UEs in wireless network 100 of FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 or other base stations and may provide received signals to demodulators (DEMODs) 254*a* through 254*r*, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254*a* through 254*r* (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

In some implementations, controller/processor 280 may be a component of a processing system. A processing system may generally refer to a system or series of machines or components that receives inputs and processes the inputs to produce a set of outputs (which may be passed to other systems or components of, for example, the UE 120). For example, a processing system of the UE 120 may refer to a system s.

The processing system of the UE 120 may interface with other components of the UE 120, and may process information received from other components (such as inputs or signals), output information to other components, etc. For example, a chip or modem of the UE 120 may include a processing system, a first interface configured to receive or obtain information, and a second interface configured to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, controller/processor 240 may be a component of a processing system. A processing system may generally refer to a system or series of machines or components that receives inputs and processes the inputs to produce a set of outputs (which may be passed to other systems or components of, for example, the BS 110). For example, a processing system of the BS 110 may refer to a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface configured to receive or obtain information, and a second interface configured to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

Controller/processor 240 of base station 110, controller/processor 280 of UE 120, or any other component(s) of FIG. 2 may perform one or more techniques associated with uplink channel transmission for multiple TRPs, as described in more detail elsewhere herein. For example, controller/processor 240 of base station 110, controller/processor 280 of UE 120, or any other component(s) (or combinations of components) of FIG. 2 may perform or direct operations of, for example, process 800 of FIG. 8, process 900 of FIG. 9, or other processes as described herein. Memories 242 and 282 may store data and program codes for base station 110 and UE 120, respectively. A scheduler 246 may schedule UEs for data transmission on the downlink, the uplink, or a combination thereof.

Figure 9:
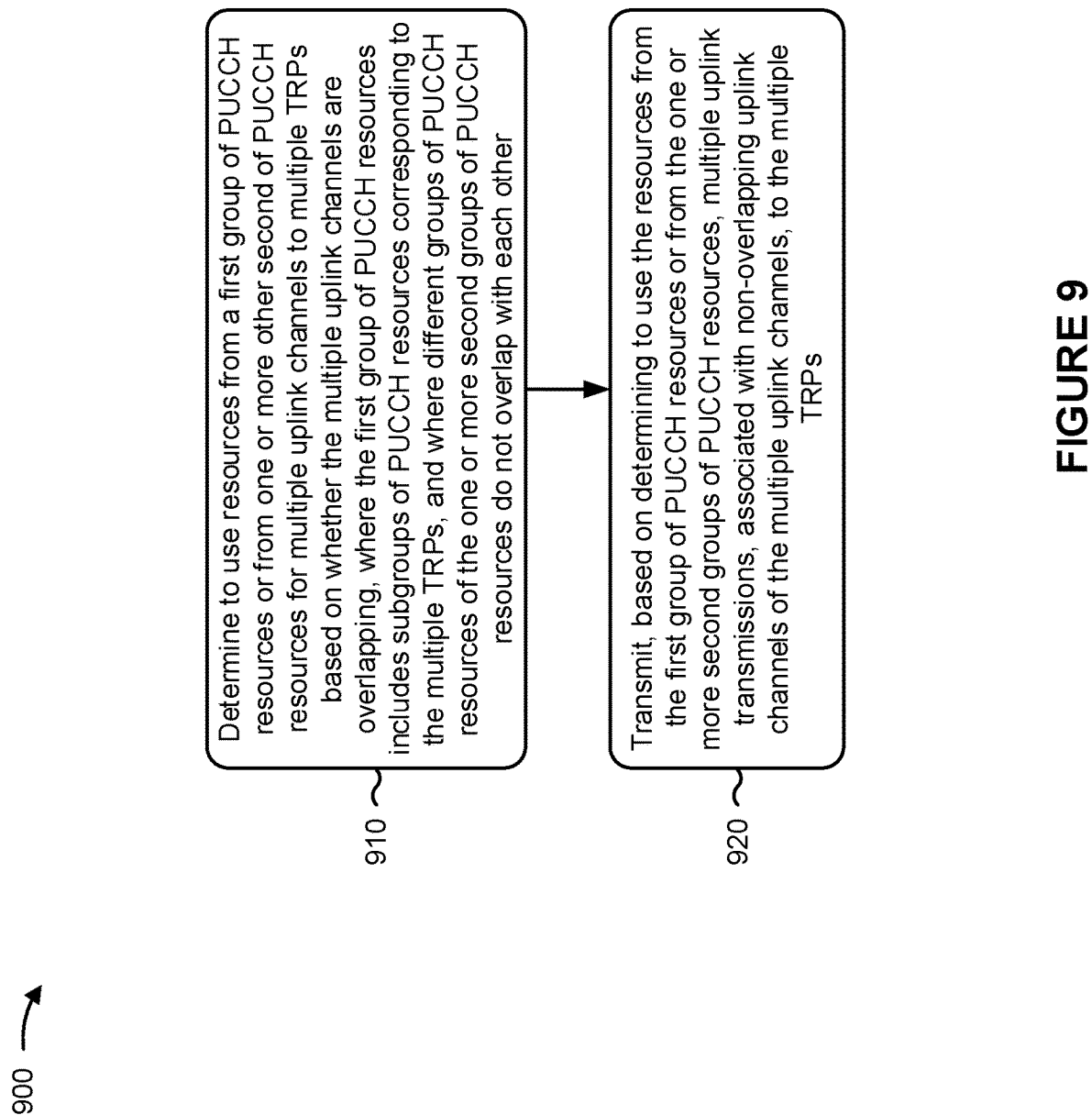

The stored program codes, when executed by controller/processor 280 or other processors and modules at UE 120, may cause the UE 120 to perform operations described with respect to process 800 of Figure, process 900 of FIG. 9, or other processes as described herein. A scheduler 246 may schedule UEs for data transmission on the downlink, the uplink, or a combination thereof.

In some aspects, UE 120 may include means for determining association information that indicates mappings between multiple TRPs and uplink channels, where the uplink channels are associated with corresponding uplink transmissions to the multiple TRPs; performing, for uplink transmissions to multiple transmit receive points (TRPs), a combination of: multiplexing or dropping of overlapping uplink channels for each TRP of the multiple TRPs and dropping of one or more uplink channels that overlap across the multiple TRPs; means for multiplexing or dropping one or more first overlapping uplink channels of the uplink channels, where the one or more first overlapping uplink channels are mapped to a same TRP of the multiple TRPs; means for dropping one or more second overlapping uplink channels, of the uplink channels, that overlap across different TRPs of the multiple TRPs; means for transmitting, to the multiple TRPs, non-overlapping uplink transmissions associated with one or more non-overlapping uplink channels, remaining from the corresponding uplink channels after the multiplexing or dropping of the one or more first overlapping uplink channels and after the dropping of the one or more second overlapping uplink channels; means for determining to use resources from a first group of PUCCH resources, or from one or more second groups of PUCCH resources, for multiple uplink channels to multiple TRPs based at least in part on whether the multiple uplink channels are overlapping with each other, where the first group of PUCCH resources includes multiple subgroups of PUCCH resources corresponding to the multiple TRPs, where the one or more second groups of PUCCH resources do not overlap with each other; means for transmitting, based on determining to use the resources from the group of PUCCH resources or from the one or more second groups of PUCCH resources, multiple uplink transmissions, associated with non-overlapping uplink channels of the multiple uplink channels, to the multiple TRPs; means for comparing two different uplink channels associated with respective TRPs of the multiple TRPs; means for dropping one of the two different uplink channels; means for selecting the resources from the first group of PUCCH resources for the multiple uplink channels prior to determining to use the resources from the first group of PUCCH resources or from the one or more second groups of PUCCH resources; means for determining to use the resources from the first group of PUCCH resources and not from the one or more second groups of PUCCH resources based at least in part on the multiple uplink channels not overlapping with the resources from the first group of PUCCH resources; determining to use the resources from the one or more second groups of PUCCH resources based at least in part on the multiple uplink channels overlapping with the resources from the first group of PUCCH resources; means for determining to use the resources from the first group of PUCCH resources for one or more first uplink channels, of the multiple uplink channels, and to use the resources from the one or more second groups of PUCCH resources for one or more second uplink channels of the multiple uplink channels other than the one or more first uplink channels; means for determining to not use the resources from the first group of PUCCH resources and to only use the resources from the one or more other second groups of PUCCH resources for the multiple uplink channels; means for performing dropping of one or more of the multiple uplink channels in association with determining to use the resources from the first group of PUCCH resources or from the one or more second groups of PUCCH resources; or further examples thereof, or combinations thereof. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
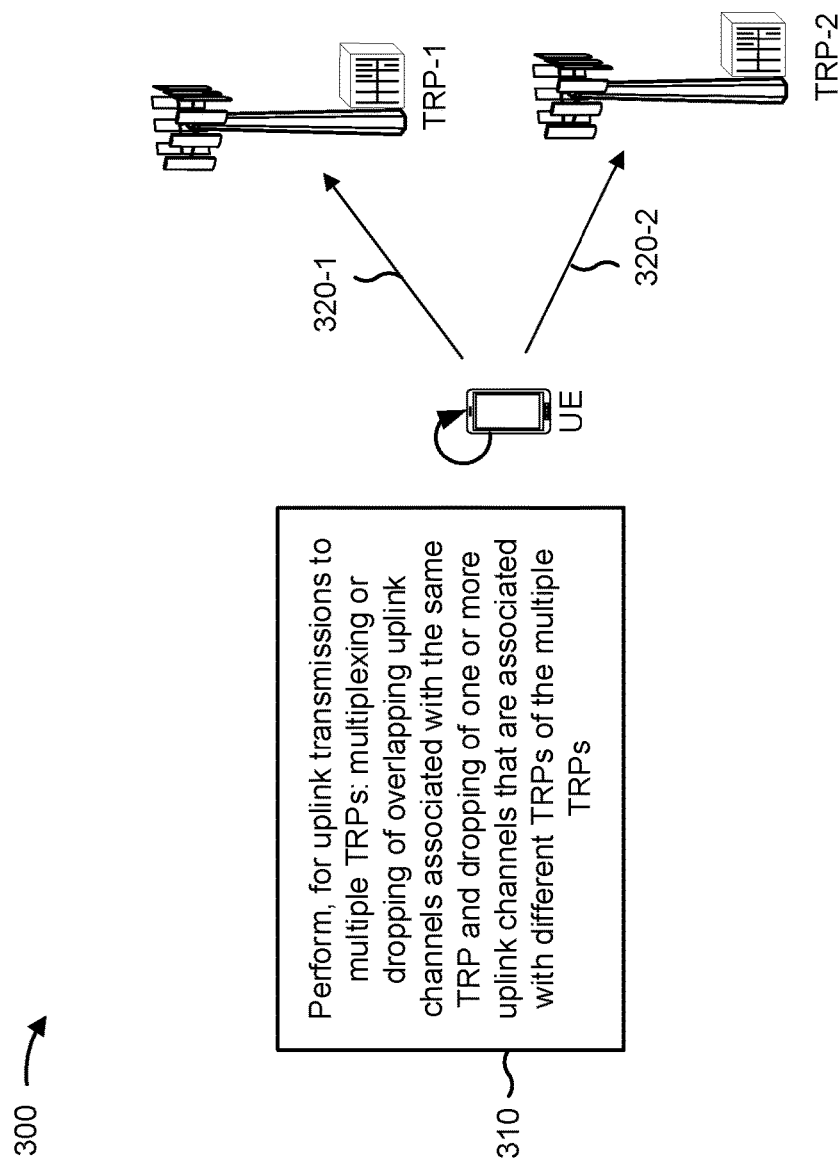
FIGS. 3-7B are diagrams illustrating one or more examples related to uplink channel transmission for multiple transmit receive points (TRPs).

FIG. 3 is a diagram illustrating an example 300 related to uplink channel transmission for multiple TRPs. As shown in FIG. 3, the example 300 includes multiple TRPs, shown as TRP-1 and TRP-2, and a UE (UE 120). Some multi-TRP deployments may use two DCI messages, corresponding to TRP-1 and TRP-2, to schedule communications. This may be referred to as a multi-DCI multi-TRP deployment. In a multi-DCI TRP deployment, TRPs may be differentiated by configuring a radio resource control (RRC) parameter (CoresetPoolIndex) to group control resource sets (CORESETs) by TRP. For example, a DCI associated with TRP-1 may be transmitted on a CORESET with a first CoresetPoolIndex, and a DCI associated with TRP-2 may be transmitted on a CORESET with a second CoresetPoolIndex.

The UE may determine (not shown) that multiple uplink transmissions are to be performed to multiple TRPs, including TRP-1 and TRP-2. The multiple uplink transmission may be associated with respective uplink channels. Some of the respective uplink channels may overlap each other with respect to a single TRP of the multiple TRPs or across two or more TRPs of the multiple TRPs.

As shown by reference number 310, the UE may perform, for uplink transmissions to multiple TRPs: multiplexing or dropping of overlapping uplink channels for a same TRP of the multiple TRPs and dropping of one or more uplink channels that overlap across different TRPs of the multiple TRPs. In one example, the UE may perform the multiplexing or dropping for uplink channels associated with the same TRP based on determining that two or more uplink channels overlap and are associated with the same TRP (such as two or more uplink channels overlap and are both associated with TRP-1 or two or more uplink channels overlap and are both associated with TRP-2). In another example, the UE may perform the dropping across TRPs based on determining that two or more uplink channels overlap are associated with different TRPs (such as one or more uplink channels associated with TRP-1 overlap with one or more uplink channels associated with TRP-2) on one or more symbols of a slot. In some aspects, the UE may perform the multiplexing or dropping for uplink channels associated with a same TRP prior to performing the dropping for uplink channels associated with different TRPs. In some aspects, the UE may perform the dropping across TRPs prior to performing the multiplexing or dropping for the same TRP. Performing the dropping across TRPs prior to performing the multiplexing or dropping for the same TRP may avoid some scenarios, such as where higher priority communications are multiplexed with lower priority communications associated with a TRP based on performing the multiplexing for uplink channels associated with the same TRP prior to performing the dropping for uplink channels associated with different TRPs.

When performing the multiplexing for uplink channels associated with the same TRP, the UE may multiplex various uplink channels. For example, the UE may multiplex UCI and a PUSCH with regard to the same TRP, may multiplex URLLC traffic and eMBB traffic, or further examples thereof. The UE may perform multiplexing for uplink channels associated with the same TRP based on a set of rules associated with resolving collisions between uplink channels. For example, the UE may multiplex UCI with a PUSCH, may multiplex UCI of a PUCCH with UCI of another PUCCH, may multiplex two CSIs with each other, may multiplex a HARQ-ACK and CSI with each other, may multiplex a HARQ-ACK and a scheduling request (SR) with each other, may multiplex a HARQ-ACK, a CSI, and an SR with each other, or further examples thereof. In some aspects, the multiplexing may result in non-overlapping PUCCHs or PUSCHs for each TRP. Additionally, or alternatively, the multiplexing may result in non-overlapping uplink channels (PUCCH or PUSCH) corresponding to URLLC traffic and eMBB traffic. In some aspects, rather than multiplexing for each TRP, the UE may drop one or more uplink channels for a TRP. For example, when multiple CSIs overlap, the UE may drop one of the CSIs depending on an RRC configuration of the UE.

When dropping the one or more uplink channels associated with a same TRPs, the UE may drop the one or more uplink channels based on a set of priority rules related to the uplink channels. For example, the set of priority rules may be based on corresponding priorities for the multiple TRPs (for example, TRP-1 may have a higher priority than TRP-2 resulting in uplink channels associated with TRP-2 being dropped to resolve overlap between uplink channels associated with TRP-1 and TRP-2, or vice versa). Additionally, or alternatively, and as another example, the set of priority rules may be based on corresponding priorities for different uplink channels associated with the uplink channels (for example, PUCCHs may be associated with a higher priority than PUSCHs resulting in PUSCHs being dropped to resolve overlap between TRP-1 and TRP-2, or vice versa). Additionally, or alternatively, and as another example, the set of priority rules may be based on corresponding priorities for different payload types for the uplink channels. For example, HARQ-ACKs, SRs, CSIs, uplink shared channels (UL-SCHs), or further examples thereof may be associated with different priorities and may be dropped according to the priorities to resolve overlap between uplink channels mapped to TRP-1 and TRP-2. In some aspects, the payload type can be a combination of the previous examples. Examples of priority levels for combined payload types include the following: different combinations having different priorities; a particular combination having a priority based on the highest priority of the different payload types included in the combination; and a combination having a priority based on an average of the priorities of payload types that are included in the combination.

As another example, the set of priority rules may be based on corresponding priorities for different traffic types of the uplink channels (for example, a HARQ-ACK corresponding to an eMBB service may have a lower priority relative to a HARQ-ACK corresponding to a URLLC service, or vice versa). Additionally, or alternatively, and as another example, the set of priority rules may be based on a combination of two or more of the following: corresponding priorities for the multiple TRPs; corresponding priorities for different uplink channels associated with the uplink channels; corresponding priorities for different payload types of the uplink channels; or corresponding priorities for different traffic types of the uplink channels. Additionally, or alternatively, and as another example, the set of priority rules may be based on a hierarchy between two or more of the following: corresponding priorities for the multiple TRPs; corresponding priorities for different uplink channels associated with the uplink channels; corresponding priorities for different payload types of the uplink channels; or corresponding priorities for different traffic types of the uplink channels.

The UE may perform the dropping for control channels mapped to different TRPs iteratively until all uplink channels in a slot are non-overlapping across the multiple TRPs. The non-overlapping uplink channels may be referred to herein as remaining uplink channels of uplink channels associated with the multiple TRPs. For example, the UE may perform the dropping by iteratively comparing two different overlapping uplink channels associated with two different TRPs (such as by comparing priorities corresponding to the two different uplink channels) and dropping one of the two different uplink channels until there are no overlapping uplink channels mapped to different TRPs for a slot. The UE may perform the comparing starting with an earliest uplink channel of the multiple uplink channels (such as the uplink channel that occupies the earliest symbol in the slot) and comparing the earliest uplink channel to the earliest overlapping uplink channel mapped to a different TRP than the earliest uplink channel. The UE may assign penalty values to the uplink channels and may perform the dropping based on the penalty values that correspond to the uplink channels. For example, a penalty value for an uplink channel may indicate a quantity of other uplink channels that overlap with the uplink channel and that may need to be dropped to not drop the uplink channel. Additionally, or alternatively, the penalty value for an uplink channel may be based on a priority of one or more other uplink channels that overlap with the uplink channel. For example, a first uplink channel may be assigned a higher penalty value based on the first uplink channel overlapping with a second uplink channel that is assigned a priority that satisfies a threshold, or that is assigned a higher priority than the first uplink channel.

In this way, the UE may drop uplink channels based on a penalty value associated with an uplink channel, a priority associated with an uplink channel, or further examples thereof. Use of a penalty value in the manner described herein may avoid scenarios where multiple uplink channels are dropped in favor of a single uplink channel with a higher priority, which may improve an efficiency of uplink communications from the UE.

When the UE performs the dropping of overlapped uplink channels mapped to different TRPs prior to performing the multiplexing or dropping of uplink channels associated with a same TRP, the UE may determine to not drop overlapping channels associated with a same TRP during the dropping of uplink channels associated with different TRPs. For example, the UE may determine to not drop overlapping uplink channels for a TRP where the overlapping uplink channels are associated with different priorities.

As shown by reference numbers 320-1 and 320-2, the UE may transmit non-overlapping uplink transmissions, associated with one or more non-overlapping uplink channels, to the multiple TRPs. For example, the UE may transmit the non-overlapping uplink transmissions after performing the multiplexing or dropping of overlapped uplink channels associated with a same TRP and the dropping of uplink channels associated with different TRPs.

Figure 4:
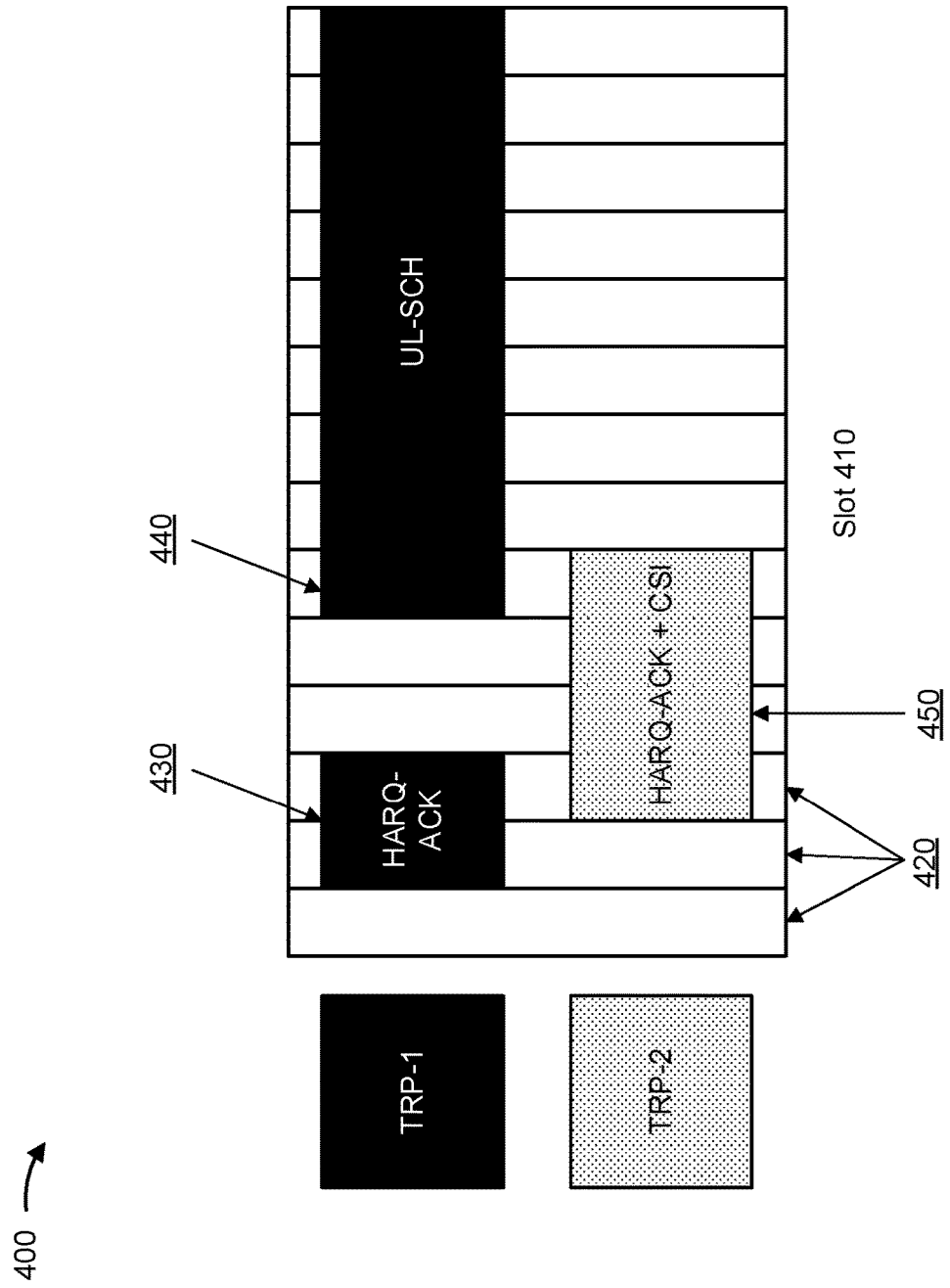

FIG. 4 is a diagram illustrating an example 400 related to uplink channel transmission for multiple TRPs. FIG. 4 shows a slot 410 with multiple symbols (shown by white rectangles, such as the ones indicated by reference number 420). In addition, FIG. 4 shows uplink channels scheduled for a first TRP (TRP-1) (for example, the uplink channels shown for the first TRP are a HARQ-ACK 430 and a UL-SCH 440, shown as black rectangles within the slot 410) and an uplink channel scheduled for a second TRP (TRP-2) (for example, the uplink channel shown for the second TRP is a combination of HARQ-ACK and CSI (HARQ-ACK+CSI) 450, shown as a dotted box within the slot 410). The HARQ-ACK for the first TRP may overlap with the combined uplink channel for the second TRP and the UL-SCH for the first TRP may overlap with the combined channel for the second TRP, as shown by the overlapped communications occurring in the same slots.

An uplink channel scheduled for a given TRP may be referred to herein as being mapped to the given TRP. For example, the UE 120 may determine association information indicating mappings between uplink channels and TRPs. The mappings may be based on scheduling information for the multiple TRPs. For example, the scheduling information may identify the mappings, and the UE 120 may determine the association information based on the mappings. In some cases, the association information may be based at least in part on control resource set (CORESET) identifiers, such as CORESET pool indices. For example, TRP differentiation may be based at least in part on a CORESET pool index of a CORESET in which DCI that triggers a given uplink channel is detected. The CORESET pool index's value may be used as a TRP identifier, and can be configured for each CORESET. Thus, CORESETs can be grouped in correspondence to TRPs. In such a case, an uplink channel associated with a DCI having a given CORESET pool index may be mapped to a TRP associated with the given CORESET pool index. Thus, the CORESET pool indexes can be considered association information.

The UE may perform the multiplexing and the dropping for overlapped uplink channels associated with a same TRP prior to performing the dropping for uplink channels associated with different TRPs. Referring to FIG. 4, none of the uplink channels for the first TRP overlap with each other and the uplink channel for the second TRP is the only uplink channel in the slot. As such, the UE may determine to not multiplex or drop any of the uplink channels on an individual TRP basis. The UE may then determine whether any of the uplink channels need to be dropped to resolve overlap between uplink channels associated with different TRPs. Referring to FIG. 4, the UE may first perform a comparison of the HARQ-ACK 430 for the first TRP and the combined uplink channel 450 for the second TRP and may determine to drop the HARQ-ACK 430 for the first TRP in favor of the combined uplink channel 450 for the second TRP based on corresponding priorities of these uplink channels. The UE may then perform a similar comparison between the combined uplink channel 450 for the second TRP and the UL-SCH 440 for the first TRP and may determine to drop the UL-SCH 440 in favor of the combined uplink channel based on corresponding priorities for these uplink channels.

This results in a scenario where multiple uplink channels are dropped in favor of a single uplink channel. If the UE were to have used penalty values described elsewhere herein, the UE may have determined to drop different uplink channels. For example, the UE may assign a penalty value of one to the HARQ-ACK 430 for the first TRP (based on the HARQ-ACK only overlapping with the combined uplink channel 450 of the second TRP), may assign a penalty value of one to the UL-SCH 440 for the first TRP (based on the UL-SCH 440 only overlapping with the combined uplink channel 450 of the second TRP), and may assign a penalty value of two to the combined uplink channel 450 for the second TRP (based on the combined uplink channel 450 overlapping with both the HARQ-ACK 430 and the UL-SCH 440 for the first TRP). In this case, a comparison between the HARQ-ACK 430 and the combined uplink channel 450 and a comparison between the UL-SCH 440 and the combined uplink channel 450 on the basis of penalty values may both result in the combined uplink channel 450 being dropped based on the combined uplink channel 450 being assigned a higher relative penalty value than the penalty values assigned for the HARQ-ACK 430 or the UL-SCH 440. This results in dropping of a single uplink channel, rather than two uplink channels, which may improve spectral efficiency of the slot 410.

Figure 5A:
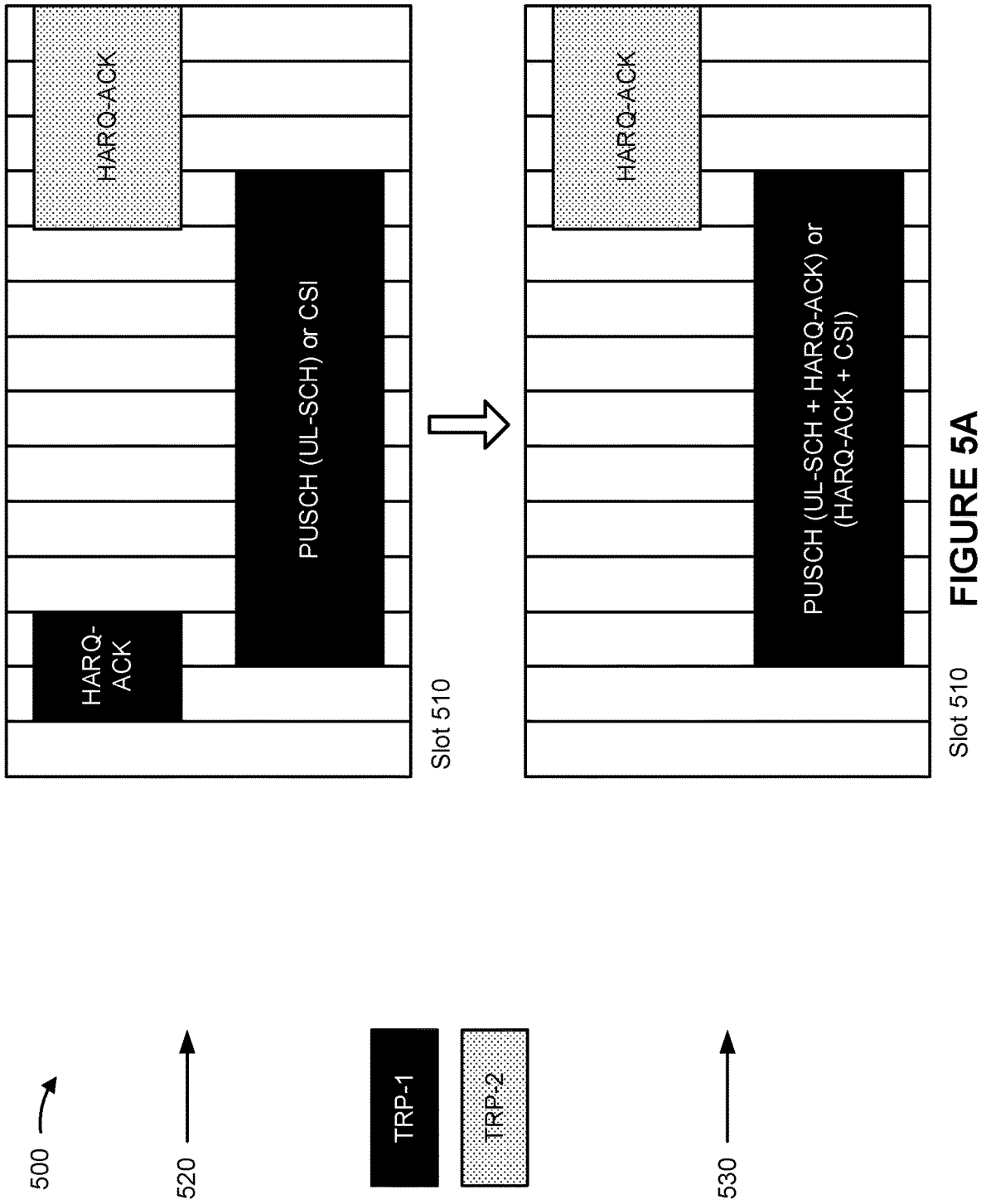

FIGS. 5A and 5B are diagrams illustrating one or more examples 500 related to uplink channel transmission for multiple TRPs. FIGS. 5A and 5B show a comparison of performing the multiplexing or dropping for each TRP and the dropping across TRPs in different orders.

FIG. 5A shows an example of performing the multiplexing or dropping of uplink channels associated with a same TRP prior to performing the dropping of uplink channels associated with different TRPs. FIG. 5A shows a slot 510 similar to the slot 410 described above. As shown by reference number 520, a slot may include various uplink channels associated with a first TRP (TRP-1) and a second TRP (TRP-2). In FIGS. 5A, 5B, 7A, and 7B, an uplink channel is indicated as associated with a TRP using a fill corresponding to the TRP. For example, an uplink channel associated with the first TRP is illustrated using a black fill and an uplink channel associated with the second TRP is illustrated using a dotted fill. As shown in FIG. 5A, two uplink channels associated with the first TRP overlap with each other. In addition, one of the uplink channels associated with the first TRP overlaps with an uplink channel associated with the second TRP. In this case, and as shown by reference number 530, the UE may determine to multiplex the two uplink channels associated with the first TRP together. In the case of performing the multiplexing or dropping for a single TRP prior to performing the dropping across TRPs, the UE will still need to drop the multiplexed uplink channels for the first TRP or the uplink channel associated with the second TRP due to overlap between these uplink channels across the TRPs. Depending on priorities corresponding to the multiplexed uplink channels associated with the first TRP or to the uplink channel associated with the second TRP, this scenario may result in the UE dropping multiplexed uplink channels for a single uplink channel, may result in a higher quantity of unused symbols in a slot, or further examples thereof.

FIG. 5B shows an example of performing the dropping across TRPs prior to performing the multiplexing or dropping for single TRPs. FIG. 5B shows the slot 510. Reference number 540 shows a similar configuration of uplink channels for the first TRP and the second TRP as was described with regard to reference number 520. As shown by reference number 550, the UE may drop the PUSCH (UL-SCH) or CSI uplink channel of the first TRP that overlaps with the HARQ-ACK uplink channel of the second TRP (such as based on corresponding priorities described elsewhere herein). As a result, the overlap across TRPs is resolved and the overlap within each TRP is resolved, thereby eliminating a need for the UE to perform the multiplexing or dropping for each TRP. This conserves processing resources of the UE or reduces an amount of time needed to perform operations related to resolving overlap of uplink channels.

Figure 6:
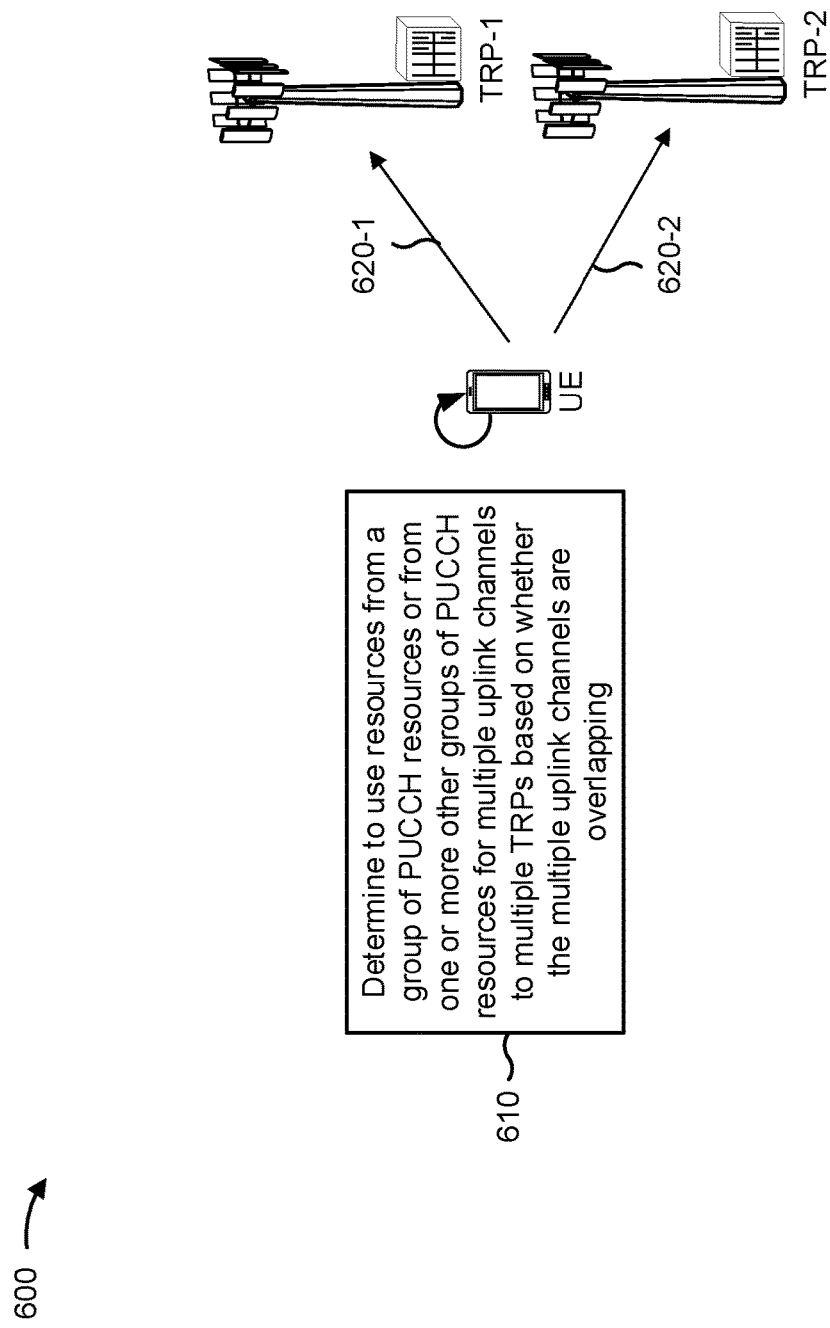

FIG. 6 is a diagram illustrating an example 600 related to uplink channel transmission for multiple TRPs. As shown in FIG. 6, the example 600 includes multiple TRPs, shown as TRP-1 and TRP-2, and a UE (such as a UE 120).

As shown by reference number 610, the UE may determine to use resources from a group of PUCCH resources or from one or more other groups of PUCCH resources for multiple uplink channels to multiple TRPs based on whether the multiple uplink channels are overlapping. For example, the UE may determine to use resources from a first group of PUCCH resources that includes subgroups of resources corresponding to the multiple TRPs or from one or more other groups of PUCCH resources that correspond to the multiple TRPs. Some of the resources of the subgroups of the first group of PUCCH resources may overlap with each other. For example, some of the resources of a first subgroup corresponding to TRP-1 may overlap with some of the resources of a second subgroup corresponding to TRP-2. In some cases, a PUCCH to one of the TRPs may occupy all symbols within a slot. Different groups of PUCCH resources of the one or more other groups of PUCCH resources may not overlap with each other. For example, a group of PUCCH resources, from the one or more other groups, corresponding to TRP-1 may not overlap with another group of PUCCH resources, from the one or more other groups, corresponding to TRP-2.

When selecting resources for uplink channels, the UE may initially select resources for a PUCCH from the first group of PUCCH resources. For example, the UE may select PUCCH resources from a subgroup, of the first group, corresponding to a TRP with which the PUCCH is associated. After selecting the resources, the UE may determine whether the PUCCH for a TRP overlaps with another uplink channel associated with the TRP or with another TRP. For example, the UE may determine whether the PUCCH for a TRP overlaps with another PUCCH or a PUSCH associated with the TRP or another TRP. If the UE determines that the PUCCH does not overlap with another uplink channel, then the UE may determine to use the PUCCH resources from the first group of PUCCH resources for the PUCCH.

If the UE determines that the PUCCH overlaps with anther uplink channel, then the UE may determine to use resources from one or more other groups of PUCCH resources to resolve the overlap. For example, if a PUCCH is overlapping with a PUSCH, then UE may determine to use resources from a group of PUCCH resources, of the one or more other groups of PUCCH resources, if the resources from the group do not overlap with resources used for the PUSCH. Where the resources from the group of PUCCH resources still overlap with the resources associated with the PUSCH, the UE may drop one of these uplink channels in a manner similar to that described elsewhere herein. For example, lower priority uplink channels may be dropped in favor of higher priority uplink channels, larger payload UCIs may be dropped, and so on. In some aspects, the dropping described elsewhere herein may be combined with the aspects described with respect to FIGS. 6-7B. For example, the UE may perform dropping of uplink channels for particular uplink channels, such as larger payload UCIs, and may perform the aspects described with respect to FIGS. 6-7B for other UCIs, such as HARQ-ACKs.

As another example, if a PUCCH overlaps with another PUCCH, the UE may determine whether selection of resources from one of the one or more other groups of PUCCH resources will eliminate the overlap. For example, the UE may determine that resources from the first group of PUCCH resources described above can be used for one of the PUCCHs, and resources from one of the one or more other groups of PUCCH resources can be used for the other PUCCH. This reduces modifications to previously scheduled uplink channels. Conversely, the UE may determine to use resources from a group, of the one or more groups of PUCCH resources, for one of the PUCCHs, and resources from another group, of the one or more other groups of PUCCHs, where the UE determines that the PUCCHs would still overlap if resources from the first group described above were used for one of the PUCCHs.

The resources from the one or more other groups of PUCCH resources may be selected via use of a PUCCH resource indicator (PRI). For example, the resources may be selected via a PEI for a HARQ-ACK. Additionally, or alternatively, the resources from the one or more other groups of PUCCH resources may be selected via use of a fixed RRC configuration. For example, the resources may be selected via a fixed RRC configuration for a HARQ-ACK, CSI, an SR, or further examples thereof.

As shown by reference numbers 620-1 and 620-2, the UE may transmit multiple uplink transmissions, associated with non-overlapping uplink channels of the multiple uplink channels, to the multiple TRPs. For example, the UE may transmit the multiple uplink transmissions based on determining to use the resources from the group of PUCCH resources or from the one or more other groups of PUCCH resources.

Figure 7A:
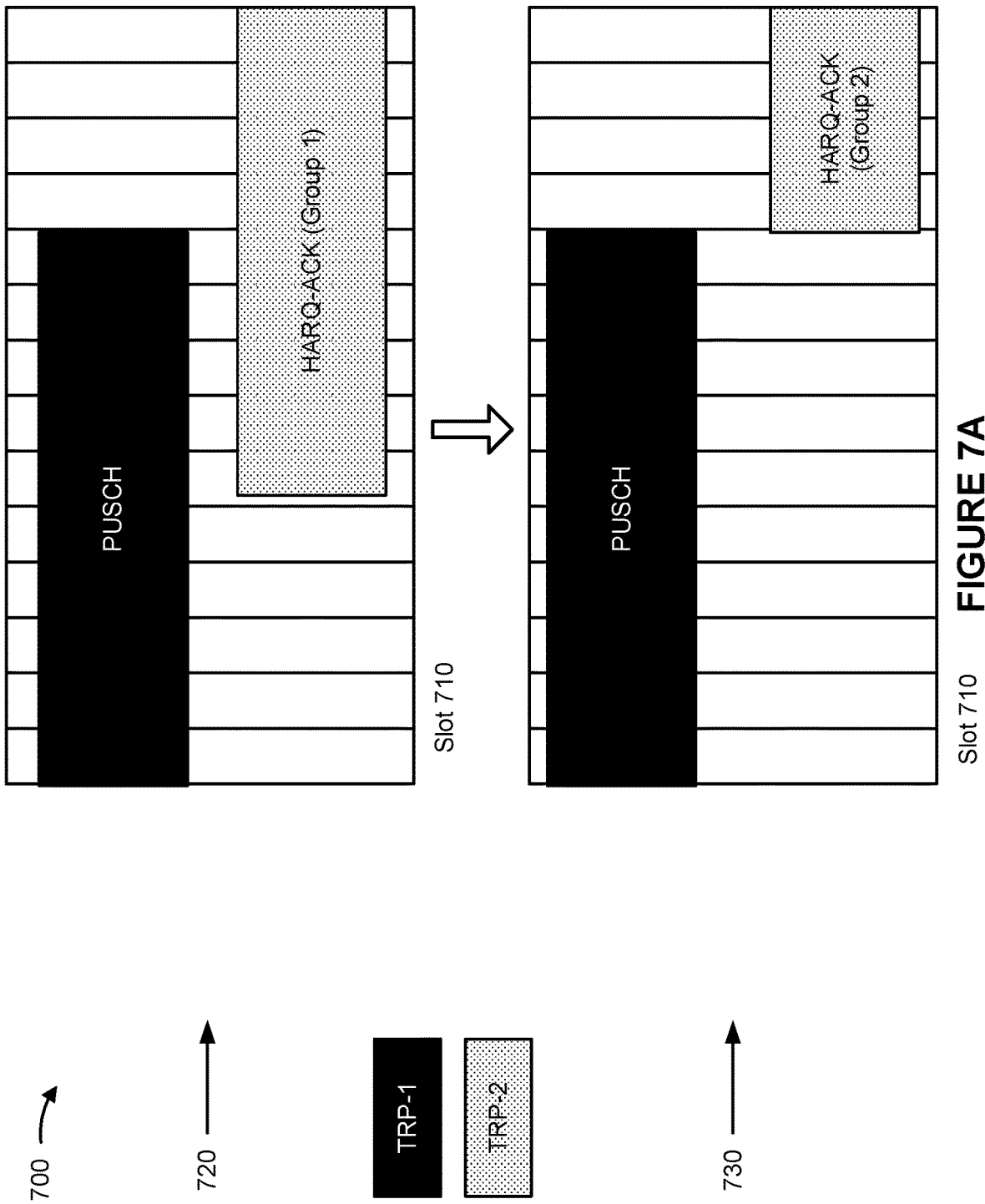
Figure 7B:
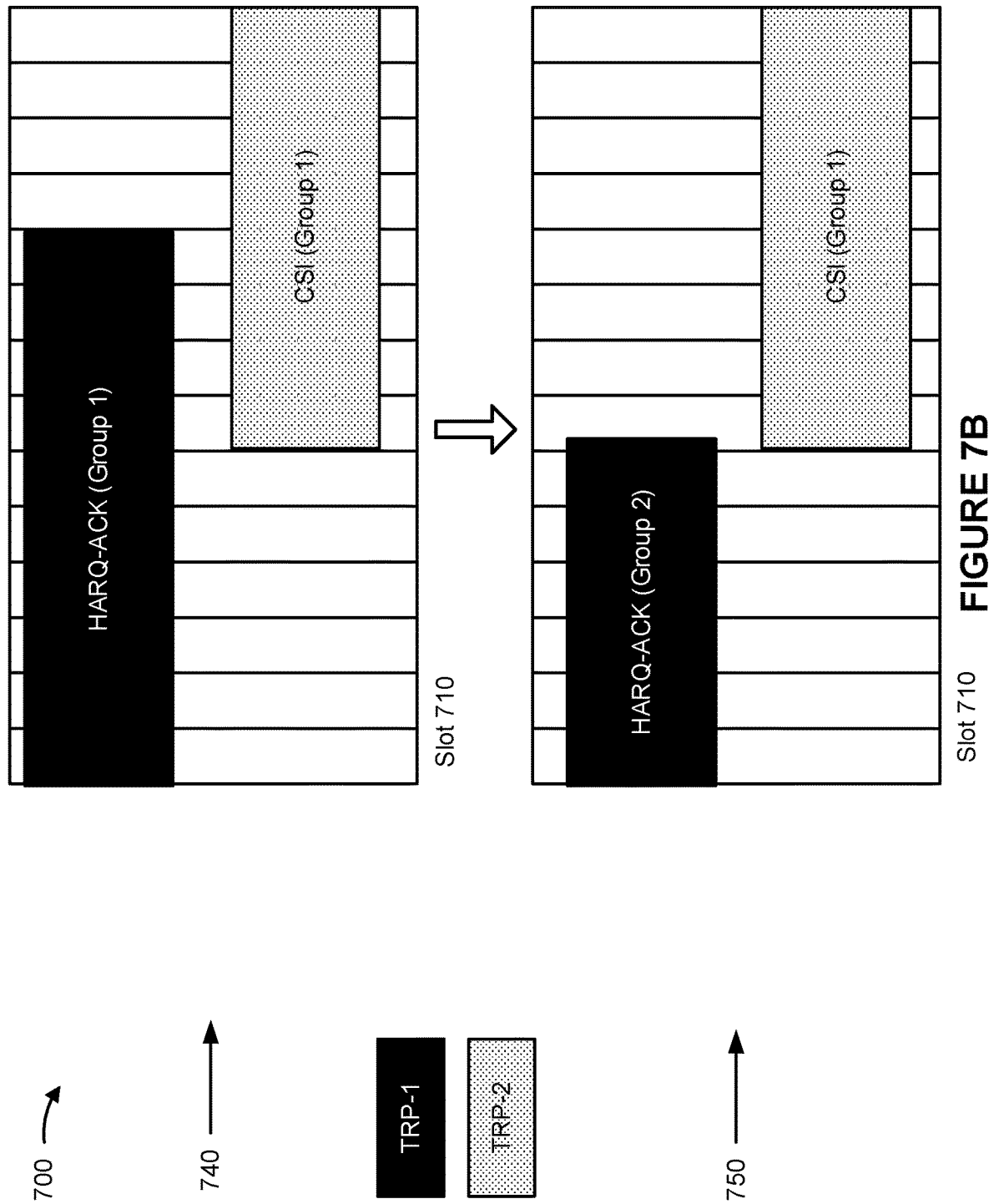

FIGS. 7A and 7B are diagrams illustrating one or more examples 700 related to uplink channel transmission for multiple TRPs. FIGS. 7A and 7B show a comparison of various ways in which the UE may determine to use resources from a group of PUCCH resources or from one or more other groups of PUCCH resources for multiple uplink channels.

FIG. 7A shows an example of a UE determining to use resources from a group of PUCCH resources or from one or more other groups of PUCCH resources for multiple uplink channels, where the multiple uplink channels include a PUCCH channel and a PUSCH channel. FIG. 7A shows a slot 710 similar to one or more other slots described elsewhere herein. As shown by reference number 720, a PUSCH associated with a first TRP (TRP-1) overlaps with a HARQ-ACK (the PUCCH channel) associated with a second TRP (TRP-2). Similar to that described above, and as shown by reference number 720, the UE may have selected resources from a first group of PUCCH resources ("Group 1" in FIG. 7) for the HARQ-ACK and may determine that these resources overlap with resources associated with the PUSCH.

As shown by reference number 730, the UE may determine that resources from another group of PUCCH resources (shown as "Group 2" in FIG. 7) can be selected for the HARQ-ACK and that selection of these resources eliminates overlap between the HARQ-ACK and the PUSCH. For example, the other group of resources may be selected from the one or more other groups of PUCCH resources as described in connection with FIG. 6. If the UE had determined that resources from the other group of PUCCH resources would not eliminate the overlap, the UE may have determined to drop the HARQ-ACK or the PUSCH, in a manner similar to that described elsewhere herein.

FIG. 7B shows an example of a UE determining to use resources from a group of PUCCH resources or from one or more other groups of PUCCH resources for multiple uplink channels, where the multiple uplink channels include two PUCCHs. As shown by reference number 740, a HARQ-ACK associated with a first TRP (TRP-1) overlaps with CSI associated with a second TRP (TRP-2). In the slot 710 shown by reference number 740, the UE may have selected resources from a first group of PUCCH resources ("Group 1" in FIG. 7) for the HARQ-ACK and the CSI and may determine that the selected resources overlap with each other.

As shown by reference number 750, the UE may determine that resources from another group of PUCCH resources (shown as "Group 2" in FIG. 7) can be selected for the HARQ-ACK and that selection of these resources eliminates overlap between the HARQ-ACK and the CSI. If the UE had determined that resources from the other group of PUCCH resources would not eliminate the overlap, the UE may have had to select resources from yet another group of PUCCH resources for the CSI from one or more other groups of PUCCH resources to eliminate overlap of the two PUCCHs.

Figure 8:
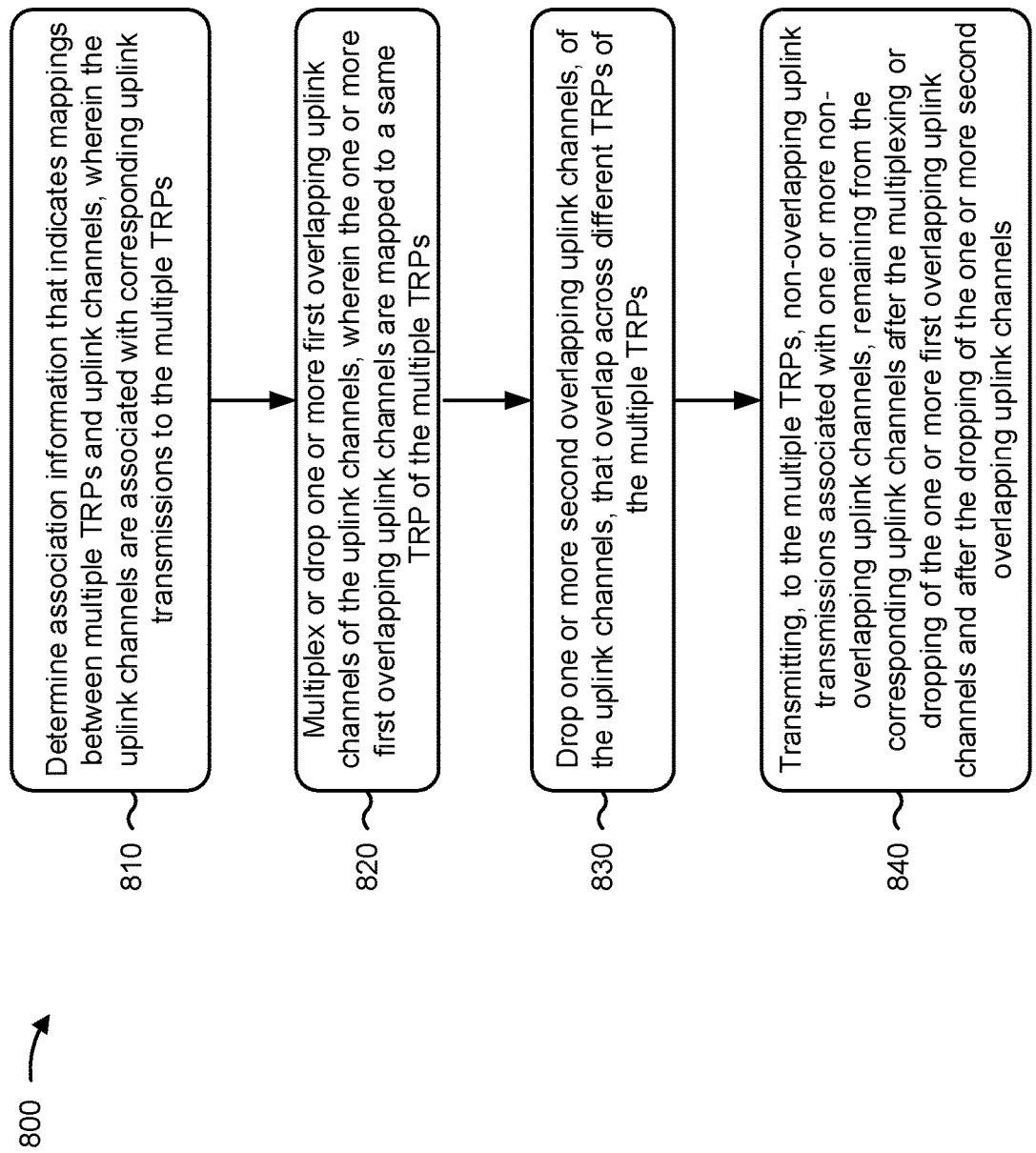
FIGS. 8 and 9 are diagrams illustrating example processes performed, for example, by a UE.

FIG. 8 is a diagram illustrating an example process 800 performed, for example, by a UE, in accordance with various aspects of the present disclosure. The example process 800 shows where a UE, such as a UE 120 or an apparatus of the UE 120, performs operations associated with uplink channel transmission for multiple TRPs.

As shown in FIG. 8, in some aspects, the process 800 may include determining association information that indicates mappings between multiple TRPs and uplink channels, where the uplink channels are associated with corresponding uplink transmissions to the multiple TRPs (block 810). For example, the UE (such as by using controller/processor 280) may determine association information that indicates mappings between multiple TRPs and uplink channels, where the uplink channels are associated with corresponding uplink transmissions to the multiple TRPs.

As shown in FIG. 8, in some aspects, the process 800 may include multiplexing or dropping one or more first overlapping uplink channels of the uplink channels, where the one or more first overlapping uplink channels are mapped to a same TRP of the multiple TRPs (block 820). For example, the UE (such as by using controller/processor 280) may multiplex or drop one or more first overlapping uplink channels of the uplink channels, where the one or more first overlapping uplink channels are mapped to a same TRP of the multiple TRPs.

As shown in FIG. 8, in some aspects, the process 800 may include dropping one or more second overlapping uplink channels, of the uplink channels, that overlap across different TRPs of the multiple TRPs (block 830). For example, the UE (such as by using controller/processor 280, transmit processor 264, TX MIMO processor 266, MOD 254, antenna 252,) may drop one or more second overlapping uplink channels, of the uplink channels, that overlap across different TRPs of the multiple TRPs.

As shown in FIG. 8, in some aspects, the process 800 may include transmitting, to the multiple TRPs, non-overlapping uplink transmissions associated with one or more non-overlapping uplink channels, remaining from the corresponding uplink channels after the multiplexing or dropping of the one or more first overlapping uplink channels and after the dropping of the one or more second overlapping uplink channels (block 840). For example, the UE (such as by using controller/processor 280, transmit processor 264, TX MIMO processor 266, MOD 254, antenna 252, or the like) may transmit, to the multiple TRPs, non-overlapping uplink transmissions associated with one or more non-overlapping uplink channels, remaining from the corresponding uplink channels after the multiplexing or dropping of the one or more first overlapping uplink channels and after the dropping of the one or more second overlapping uplink channels.

The process 800 may include additional aspects, such as any single aspect or any combination of aspects described below or in connection with one or more other processes described elsewhere herein.

In a first aspect, the multiplexing or dropping of the one or more first overlapping uplink channels is performed prior to the dropping of the one or more second overlapping uplink channels. In a second aspect, alone or in combination with the first aspect, the dropping of the one or more second overlapping uplink channels is based at least in part on a set of priority rules related to the uplink channels. In a third aspect, alone or in combination with one or more of the first and second aspects, the set of priority rules is based on corresponding priorities for the multiple TRPs.

In a fourth aspect, alone or in combination with one or more of the first through third aspects, the set of priority rules is based on corresponding priorities associated with the uplink channels. In a fifth aspect, alone or in combination with one or more of the first through fourth aspects, the set of priority rules is based on corresponding priorities for payload types of the uplink channels. In a sixth aspect, alone or in combination with one or more of the first through fifth aspects, the set of priority rules is based on corresponding priorities for traffic types of the uplink channels.

In a seventh aspect, alone or in combination with one or more of the first through sixth aspects, the set of priority rules is based on a combination of two or more of corresponding priorities for the multiple TRPs, corresponding priorities associated with the uplink channels, corresponding priorities for payload types of the uplink channels, or corresponding priorities for traffic types of the uplink channels. In an eighth aspect, alone or in combination with one or more of the first through seventh aspects, the set of priority rules is based on a hierarchy between two or more of corresponding priorities for the multiple TRPs, corresponding priorities associated with the uplink channels, corresponding priorities for payload types of the uplink channels, or corresponding priorities for traffic types of the uplink channels.

In a ninth aspect, alone or in combination with one or more of the first through eighth aspects, the dropping of the one or more second overlapping uplink channels is performed iteratively by comparing two different uplink channels associated with respective TRPs of the multiple TRPs, and dropping one of the two different uplink channels. In a tenth aspect, alone or in combination with one or more of the first through ninth aspects, the comparing starts from an earliest uplink channel of the two different uplink channels.

In an eleventh aspect, alone or in combination with one or more of the first through tenth aspects, the dropping of the one or more second overlapping uplink channels is based on penalty values corresponding to the uplink channels.

In a twelfth aspect, alone or in combination with one or more of the first through eleventh aspects, a penalty value for an uplink channel of the uplink channels is based at least in part on a quantity of other uplink channels that overlap with the uplink channel. In a thirteenth aspect, alone or in combination with one or more of the first through twelfth aspects, a penalty value for an uplink channel of the uplink channels is based on corresponding priorities for one or more other uplink channels, of the uplink channels, that overlap with the uplink channel.

In a fourteenth aspect, alone or in combination with one or more of the first through thirteenth aspects, the dropping of the one or more second overlapping uplink channels is performed prior to the multiplexing or dropping of the one or more first overlapping uplink channels. In a fifteenth aspect, alone or in combination with one or more of the first through fourteenth aspects, a set of overlapping uplink channels associated with a same TRP, of the multiple TRPs, is not dropped. In a sixteenth aspect, alone or in combination with one or more of the first through fifteenth aspects, the association information is based at least in part on respective control resource set pool indexes associated with the multiple TRPs.

Although FIG. 8 shows example blocks of the process 800, in some aspects, the process 800 may include additional blocks, fewer blocks, different blocks, or differently arranged blocks than those depicted in FIG. 8. Additionally, or alternatively, two or more of the blocks of the process 800 may be performed in parallel.

FIG. 9 is a diagram illustrating an example process 900 performed, for example, by a UE, in accordance with various aspects of the present disclosure. The example process 900 shows where a UE, such as the UE 120 or an apparatus of the UE 120, performs operations associated with uplink channel transmission for multiple TRPs.

As shown in FIG. 9, in some aspects, the process 900 may include determining to use resources from a first group of PUCCH resources or from one or more second groups of PUCCH resources for multiple uplink channels to multiple TRPs based on whether the multiple uplink channels are overlapping, where the first group of PUCCH resources includes subgroups of PUCCH resources corresponding to the multiple TRPs, and where different groups of PUCCH resources of the one or more second groups of PUCCH resources do not overlap with each second (block 910). For example, the UE (such as by using controller/processor 280) may determine to use resources from a group of PUCCH resources or from one or more second groups of PUCCH resources for multiple uplink channels to multiple TRPs based on whether the multiple uplink channels are overlapping. In some aspects, the first group of PUCCH resources includes subgroups of PUCCH resources corresponding to the multiple TRPs. In some aspects, different groups of PUCCH resources of the one or more second groups of PUCCH resources do not overlap with each second.

As shown in FIG. 9, in some aspects, the process 900 may include transmitting, based on determining to use the resources from the first group of PUCCH resources or from the one or more second groups of PUCCH resources, multiple uplink transmissions, associated with non-overlapping uplink channels of the multiple uplink channels, to the multiple TRPs (block 920). For example, the UE such as by using controller/processor 280, transmit processor 264, TX MIMO processor 266, MOD 254, antenna 252) may transmit, based on determining to use the resources from the first group of PUCCH resources or from the one or more second groups of PUCCH resources, multiple uplink transmissions, associated with non-overlapping uplink channels of the multiple uplink channels, to the multiple TRPs.

The process 900 may include additional aspects, such as any single aspect or any combination of aspects described below or in connection with one or more second processes described elsewhere herein.

In a first aspect, the one or more second groups of PUCCH resources include groups of PUCCH resources corresponding to the multiple TRPs. In a second aspect, alone or in combination with the first aspect, the UE may select the resources from the first group of PUCCH resources for the multiple uplink channels prior to determining to use the resources from the first group of PUCCH resources or from the one or more second groups of PUCCH resources.

In a third aspect, alone or in combination with one or more of the first and second aspects, the UE may determine to use the resources from the first group of PUCCH resources and not from the one or more second groups of PUCCH resources based on the multiple uplink channels not overlapping on the resources from the first group of PUCCH resources. In a fourth aspect, alone or in combination with one or more of the first through third aspects, the UE may determine to use the resources from the one or more second groups of PUCCH resources based on the multiple uplink channels overlapping on the resources from the first group of PUCCH resources.

In a fifth aspect, alone or in combination with one or more of the first through fourth aspects, the UE may determine to use the resources from the first group of PUCCH resources for one or more of the multiple uplink channels and to use the resources from the one or more second groups of PUCCH resources for one or more second uplink channels of the multiple uplink channels, or may determine to not use the resources from the first group of PUCCH resources and to only use the resources from the one or more second groups of PUCCH resources for the multiple uplink channels. In a sixth aspect, alone or in combination with one or more of the first through fifth aspects, the resources from the one or more second groups of PUCCH resources are selected based at least in part on at least one of: a PUCCH resource indicator (PRI), or a fixed radio resource control (RRC) configuration. In a seventh aspect, alone or in combination with one or more of the first through sixth aspects, the UE may perform dropping of one or more of the multiple uplink channels in association with determining to use the resources from the first group of PUCCH resources or from the one or more second groups of PUCCH resources.

Although FIG. 9 shows example blocks of the process 900, in some aspects, the process 900 may include additional blocks, fewer blocks, different blocks, or differently arranged blocks than those depicted in FIG. 9. Additionally, or alternatively, two or more of the blocks of the process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or further examples thereof.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a user equipment (UE), comprising:
   determining association information that indicates mappings between multiple transmit receive points (TRPs) and uplink channels,
      wherein the uplink channels are associated with corresponding uplink transmissions to the multiple TRPs;
   multiplexing or dropping one or more first overlapping uplink channels of the uplink channels,
      wherein the one or more first overlapping uplink channels are mapped to a same TRP of the multiple TRPs;
   dropping one or more second overlapping uplink channels, of the uplink channels, that overlap across different TRPs of the multiple TRPs,
      wherein at least one of the dropping of the one or more first overlapping uplink channels or the dropping of the one or more second overlapping uplink channels is based at least in part on a set of priority rules related to the uplink channels,
         wherein the set of priority rules is based at least in part on corresponding priorities for payload types of the uplink channels; and
   transmitting, to the multiple TRPs, non-overlapping uplink transmissions associated with one or more non-overlapping uplink channels remaining from the uplink channels after the multiplexing or the dropping of the one or more first overlapping uplink channels and after the dropping of the one or more second overlapping uplink channels.

2. The method of claim 1, wherein the multiplexing or the dropping of the one or more first overlapping uplink channels is performed prior to the dropping of the one or more second overlapping uplink channels.

3. The method of claim 1, wherein the set of priority rules is further based at least in part on corresponding priorities for the multiple TRPs.

4. The method of claim 1, wherein the set of priority rules is further based at least in part on corresponding priorities associated with the uplink channels.

5. The method of claim 1, wherein the set of priority rules is further based at least in part on corresponding priorities for traffic types of the uplink channels.

6. The method of claim 1, wherein the set of priority rules is further based at least in part on a combination of two or more of:
   corresponding priorities for the multiple TRPs,
   corresponding priorities associated with the uplink channels, or
   corresponding priorities for traffic types of the uplink channels.

7. The method of claim 1, wherein the set of priority rules is further based at least in part on a hierarchy between two or more of:
   corresponding priorities for the multiple TRPs,
   corresponding priorities associated with the uplink channels,
   the corresponding priorities for the payload types of the uplink channels, or
   corresponding priorities for traffic types of the uplink channels.

8. The method of claim 1, wherein the dropping of the one or more second overlapping uplink channels is performed iteratively by:
   comparing two different uplink channels associated with respective TRPs of the multiple TRPs, and
   dropping one of the two different uplink channels.

9. The method of claim 8, wherein the comparing starts from an earliest uplink channel of the two different uplink channels.

10. The method of claim 1, wherein the dropping of the one or more second overlapping uplink channels is based at least in part on penalty values corresponding to the uplink channels.

11. The method of claim 10, wherein a penalty value for an uplink channel of the uplink channels is based at least in part on a quantity of other uplink channels that overlap with the uplink channel.

12. The method of claim 10, wherein a penalty value for an uplink channel of the uplink channels is based at least in part on corresponding priorities for one or more other uplink channels, of the uplink channels, that overlap with the uplink channel.

13. The method of claim 1, wherein the dropping of the one or more second overlapping uplink channels is performed prior to the multiplexing or the dropping of the one or more first overlapping uplink channels.

14. The method of claim 13, wherein a set of uplink channels associated with a same TRP, of the multiple TRPs, is not dropped.

15. The method of claim 1, wherein the association information is based at least in part on respective control resource set pool indexes associated with the multiple TRPs.

16. An apparatus of a user equipment (UE) for wireless communication, comprising:
a processing system configured to:
determine association information that indicates mappings between multiple transmit receive points (TRPs) and uplink channels,
wherein the uplink channels are associated with corresponding uplink transmissions to the multiple TRPs;
multiplex or drop one or more first overlapping uplink channels of the uplink channels,
wherein the one or more first overlapping uplink channels are mapped to a same TRP of the multiple TRPs; and
drop one or more second overlapping uplink channels, of the uplink channels, that overlap across different TRPs of the multiple TRPs,
wherein at least one of the dropping of the one or more first overlapping uplink channels or the dropping of the one or more second overlapping uplink channels is based at least in part on a set of priority rules related to the uplink channels,
wherein the set of priority rules is based at least in part on corresponding priorities for payload types of the uplink channels; and
an interface configured to:
output non-overlapping uplink transmissions associated with one or more non-overlapping uplink channels remaining from the uplink channels after the multiplexing or the dropping of the one or more first overlapping uplink channels and after the dropping of the one or more second overlapping uplink channels.

17. The apparatus of claim 16, wherein the multiplexing or the dropping of the one or more first overlapping uplink channels is configured to be performed prior to the dropping of the one or more second overlapping uplink channels.

18. The apparatus of claim 16, wherein the dropping of the one or more second overlapping uplink channels is performed iteratively by:
comparing two different uplink channels associated with respective TRPs of the multiple TRPs, and
dropping one of the two different uplink channels.

19. The apparatus of claim 18, wherein the comparing starts from an earliest uplink channel of the two different uplink channels.

20. The apparatus of claim 16, wherein the dropping of the one or more second overlapping uplink channels is based at least in part on penalty values corresponding to the uplink channels.

21. The apparatus of claim 16, wherein the dropping of the one or more second overlapping uplink channels is performed prior to the multiplexing or the dropping of the one or more first overlapping uplink channels.

22. The apparatus of claim 16, wherein the association information is based at least in part on respective control resource set pool indexes associated with the multiple TRPs.

23. The apparatus of claim 16, wherein the set of priority rules is further based at least in part on corresponding priorities for traffic types of the uplink channels.

24. A non-transitory computer-readable medium storing one or more instructions for wireless communication, the one or more instructions comprising:
one or more instructions that, when executed by one or more processors of a user equipment (UE), cause the one or more processors to:
determine association information that indicates mappings between multiple transmit receive points (TRPs) and uplink channels,
wherein the uplink channels are associated with corresponding uplink transmissions to the multiple TRPs;
multiplex or drop one or more first overlapping uplink channels of the uplink channels,
wherein the one or more first overlapping uplink channels are mapped to a same TRP of the multiple TRPs;
drop one or more second overlapping uplink channels, of the uplink channels, that overlap across different TRPs of the multiple TRPs,
wherein at least one of the dropping of the one or more first overlapping uplink channels or the dropping of the one or more second overlapping uplink channels is based at least in part on a set of priority rules related to the uplink channels,
wherein the set of priority rules is based at least in part on corresponding priorities for payload types of the uplink channels; and
transmit, to the multiple TRPs, non-overlapping uplink transmissions associated with one or more non-overlapping uplink channels remaining from the uplink channels after the multiplexing or the dropping of the one or more first overlapping uplink channels and after the dropping of the one or more second overlapping uplink channels.

25. The non-transitory computer-readable medium of claim 24, wherein the dropping of the one or more second overlapping uplink channels is performed iteratively by:
comparing two different uplink channels associated with respective TRPs of the multiple TRPs, and
dropping one of the two different uplink channels.

26. The non-transitory computer-readable medium of claim 24, wherein the set of priority rules is further based at least in part on corresponding priorities for traffic types of the uplink channels.

27. The non-transitory computer-readable medium of claim 24, wherein the multiplexing or the dropping of the one or more first overlapping uplink channels is performed prior to the dropping of the one or more second overlapping uplink channels.

28. An apparatus for wireless communication, comprising:
- means for determining association information that indicates mappings between multiple transmit receive points (TRPs) and uplink channels,
  - wherein the uplink channels are associated with corresponding uplink transmissions to the multiple TRPs;
- means for multiplexing or dropping one or more first overlapping uplink channels of the uplink channels,
  - wherein the one or more first overlapping uplink channels are mapped to a same TRP of the multiple TRPs;
- means for dropping one or more second overlapping uplink channels, of the uplink channels, that overlap across different TRPs of the multiple TRPs,
  - wherein at least one of the dropping of the one or more first overlapping uplink channels or the dropping of the one or more second overlapping uplink channels is based at least in part on a set of priority rules related to the uplink channels,
  - wherein the set of priority rules is based at least in part on corresponding priorities for payload types of the uplink channels; and
- means for transmitting, to the multiple TRPs, non-overlapping uplink transmissions associated with one or more non-overlapping uplink channels remaining from the uplink channels after the multiplexing or the dropping of the one or more first overlapping uplink channels and after the dropping of the one or more second overlapping uplink channels.

29. The apparatus of claim 28, wherein the multiplexing or the dropping of the one or more first overlapping uplink channels is performed prior to the dropping of the one or more second overlapping uplink channels.

30. The apparatus of claim 28, wherein the set of priority rules is further based at least in part on corresponding priorities for traffic types of the uplink channels.

\* \* \* \* \*